US012656980B2

(12) United States Patent
Moon et al.

(10) Patent No.: US 12,656,980 B2
(45) Date of Patent: Jun. 16, 2026

(54) STORAGE DEVICE, MEMORY CONTROLLER, NON-VOLATILE MEMORY DEVICE, AND METHOD OF OPERATING MEMORY CONTROLLER FOR CONTROLLING DATA OUTPUT TIMING

(71) Applicant: SAMSUNG ELECTRONICS CO., LTD., Suwon-si (KR)

(72) Inventors: Youngsuk Moon, Suwon-si (KR); Heehyun Nam, Suwon-si (KR); Youngmin Park, Suwon-si (KR); Jonghyun Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/974,230

(22) Filed: Dec. 9, 2024

(65) Prior Publication Data

US 2025/0383812 A1 Dec. 18, 2025

(30) Foreign Application Priority Data

Jun. 14, 2024 (KR) ........................ 10-2024-0077759

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC .... G06F 3/0659; G06F 3/0604; G06F 3/0679; G06F 13/1689
See application file for complete search history.

(56) References Cited

U.S. PATENT DOCUMENTS

| | | | |
|---|---|---|---|
| 7,515,471 | B2 | 4/2009 | Oh et al. |
| 7,719,892 | B2 | 5/2010 | Kim et al. |

(Continued)

FOREIGN PATENT DOCUMENTS

| | | |
|---|---|---|
| KR | 10-2071527 B1 | 1/2020 |
| KR | 10-2023-0144471 A | 10/2023 |
| KR | 10-2649888 B1 | 3/2024 |

OTHER PUBLICATIONS

Communication dated Sep. 10, 2025, issued by the European Patent Office in European Application No. 25168759.6.

(Continued)

*Primary Examiner* — Tasnima Matin
(74) *Attorney, Agent, or Firm* — Sughrue Mion, PLLC

(57) ABSTRACT

A storage device includes non-volatile memory dies, and a memory controller that outputs a first data output command address packet and receives first data. The memory controller receives the first data from a first non-volatile memory die through a data bus, and sequentially outputs a second data output command packet that instructs a second non-volatile memory die among the plurality of non-volatile memory dies to output second data, a second select chip enable packet that selects the second non-volatile memory die, and a first select chip terminate command packet that terminates selection of the first non-volatile memory die. The second select chip enable packet includes a header that indicates a select chip enable, a first body that specifies the second non-volatile memory die, and a second body that includes first delay information for delaying an output point in time of the second data.

20 Claims, 20 Drawing Sheets

100

110

MEMORY CONTROLLER

COMMAND GENERATOR 111

FIRST COMMAND QUEUE 112

SECOND COMMAND QUEUE 113

DQ[7:0] 131
DQS 132
RE 133
CA_CE#[n] 141
CA[1:0] 142
CA_CLK 143

120

NON-VOLATILE MEMORY DEVICE

FIRST NON-VOLATILE MEMORY DIE 121

SECOND NON-VOLATILE MEMORY DIE 122

(56)  References Cited

U.S. PATENT DOCUMENTS

| | | | |
|---|---|---|---|
| 10,416,705 | B2 | 9/2019 | Choi et al. |
| 10,528,255 | B2 | 1/2020 | Lee et al. |
| 2014/0368241 | A1* | 12/2014 | Ko ........................... G11C 7/20 |
| | | | 327/143 |
| 2018/0173465 | A1* | 6/2018 | Tanaka ................ G06F 13/4022 |
| 2024/0053928 | A1 | 2/2024 | Ou et al. |
| 2024/0135985 | A1* | 4/2024 | Hong ..................... G11C 7/222 |

OTHER PUBLICATIONS

Kuo "Separate command address(SCA) NAND interface for client SSD applications", 2023 Flash Memory Summit, Aug. 7, 2023, XP093180000, pp. 1-30 (30 pages total).

* cited by examiner

| HEADER | HEADER RISING EDGE | | HEADER FALLING EDGE | | CA PACKET TYPE |
|---|---|---|---|---|---|
| | CA[1] | CA[0] | CA[1] | CA[0] | |
| 0x0 | 0 | 0 | 0 | 0 | CA Data Output |
| 0x8 | 0 | 0 | 0 | 1 | CA Data Input |
| 0x1 | 0 | 1 | 0 | 0 | Address |
| 0x2 | 1 | 0 | 0 | 0 | Command |
| 0x3 | 1 | 1 | 0 | 0 | LUN Selection (LUNSel) |
| 0x7 | 1 | 1 | 0 | 1 | Select Chip Enable (SCE) |
| 0xB | 1 | 1 | 1 | 0 | Select Chip Pause (SCP) |
| 0xF | 1 | 1 | 1 | 1 | Select Chip Terminate (SCT) |

STORAGE DEVICE, MEMORY CONTROLLER, NON-VOLATILE MEMORY DEVICE, AND METHOD OF OPERATING MEMORY CONTROLLER FOR CONTROLLING DATA OUTPUT TIMING

CROSS-REFERENCE TO RELATED APPLICATION

This application is based on and claims priority under 35 U.S.C. § 119 to Korean Patent Application No. 10-2024-0077759, filed on Jun. 14, 2024, in the Korean Intellectual Property Office, the disclosure of which being incorporated by reference herein in its entirety.

BACKGROUND

Apparatuses, devices, and method consistent with the present disclosure relate to an electronic device, and more particularly, to a storage device, a memory controller, a non-volatile memory device, and a method of operating a memory controller for controlling data output timing.

Semiconductor memories are widely used to store data in various electronic devices such as computers and wireless communication devices. Non-volatile memory as a type of semiconductor memory is a device capable of storing data even in an environment in which power is not supplied to the device. Various mobile devices or electronic devices such as a smartphone, a desktop computer, a laptop computer, a tablet personal computer (PC), and a wearable device are widely used. The electronic devices include storage devices for storing data. As one of the storage devices, a flash-based memory system is widely used.

In the flash-based memory system, a flash memory device may communicate with a memory controller through various interface methods. In a NAND interface method, a command address signal and data are transmitted through the same input/output bus. In a separate command address (SCA) interface method, a command address signal and data are transmitted through different input/output buses. As the operating frequency of the flash-based memory system increases, research is being conducted to prevent performance of the flash-based memory system from deteriorating due to an increase in command overhead.

SUMMARY

It is an aspect to provide a storage device, a memory controller, a non-volatile memory device, and a method of operating a memory controller for controlling data output timing to improve read performance of a storage system and to prevent output timing of data from being delayed.

According to an aspect of one or more embodiments, there is provided a storage device comprising a non-volatile memory device including a plurality of non-volatile memory dies; and a memory controller configured to output a first data output command address packet that instructs a first non-volatile memory die among the plurality of non-volatile memory dies to output first data, through a command address bus, receive the first data from the first non-volatile memory die through a data bus, and sequentially output a second data output command packet that instructs a second non-volatile memory die among the plurality of non-volatile memory dies to output second data, a second select chip enable packet that selects the second non-volatile memory die, and a first select chip terminate command packet that terminates selection of the first non-volatile memory die,

2 through the command address bus, and the second select chip enable packet comprises a header that indicates a select chip enable, a first body that specifies the second non-volatile memory die, and a second body that includes first delay information for delaying an output point in time of the second data.

According to another aspect of one or more embodiments, there is provided a method of operating a memory controller, the method comprising receiving first data from a first non-volatile memory die; inserting delay information in a second select chip enable packet that selects a second non-volatile memory die, the delay information delaying an output timing of second data and being based on whether a second data output command packet that instructs the second non-volatile memory die to output second data is output before a first select chip terminate command packet that terminates selection of the first non-volatile memory die is output; and outputting a command packet including the second data output command packet, the second select chip enable packet, and the first select chip terminate command packet based on the delay information that is set.

According to yet another aspect of one or more embodiments, there is provided a memory controller comprising a first command queue configured to store a first data output command packet that instructs a first non-volatile memory die to output first data, a first select chip enable packet that selects the first non-volatile memory die, and a first select chip terminate command packet that terminates selection of the first non-volatile memory die; a second command queue configured to store a second data output command packet that instructs a second non-volatile memory die to output second data and a second select chip enable packet that selects the second non-volatile memory die; and a command generator configured to sequentially dequeue the first data output command packet and the first select chip enable packet from the first command queue during a first period, to sequentially dequeue the second data output command packet and the second select chip enable packet from the second command queue during a second period after the first period, and to dequeue the first select chip terminate command packet from the first command queue after the second select chip enable packet is output. The second select chip enable packet comprises first delay information for delaying an output point in time of the second data.

According to yet another aspect of one or more embodiments, there is provided a non-volatile memory device comprising a memory cell array including a plurality of memory cells; a control logic circuit configured to generate a buffer control signal based on a data output command received through a command address bus, to determine a data enable signal output timing of a data enable signal based on a select chip enable that is received through the command address bus and that includes delay information for delaying a data output timing of data, and to generate the data enable signal based on the data enable signal output timing; a page buffer group configured to latch internal data stored in the memory cell array based on the buffer control signal; and a data input/output circuit connected to a data bus based on the data enable signal and configured to output the latched internal data through the data bus.

BRIEF DESCRIPTION OF THE DRAWINGS

Various embodiments will be more clearly understood from the following detailed description taken in conjunction with the accompanying drawings, in which:

FIG. 1 is a block diagram of a storage device according to an embodiment;

FIG. 3 is a diagram illustrating a type of a command address packet according to an embodiment;

FIG. 18 is a block diagram of a storage system according to an embodiment;

DETAILED DESCRIPTION

Figure 2:
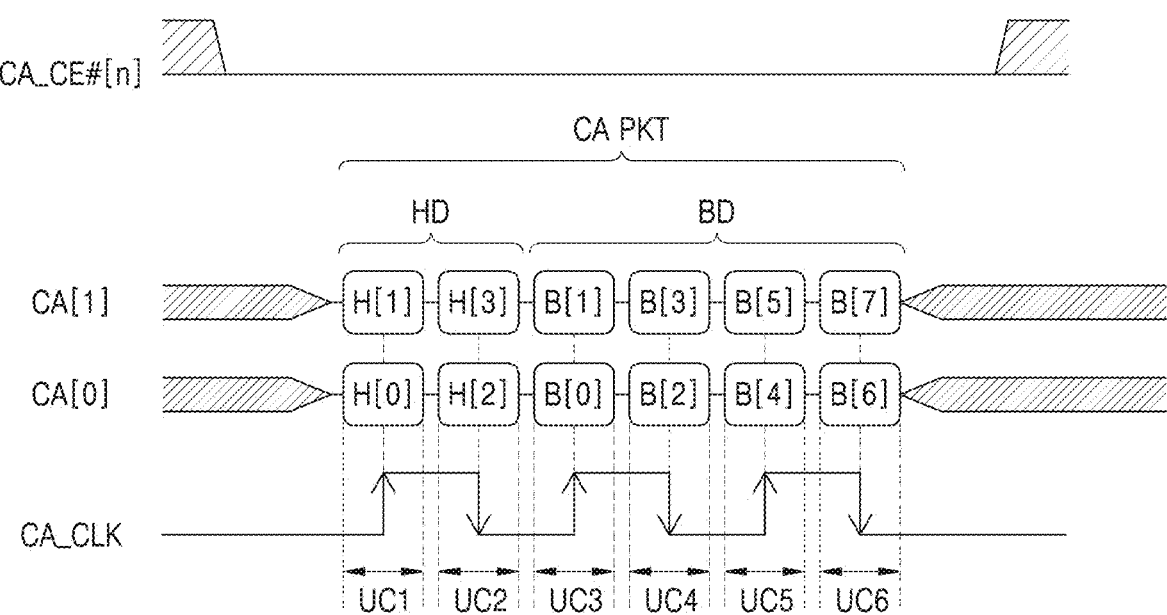
FIG. 2 is a diagram illustrating a configuration of a command address packet according to an embodiment.

Hereinafter, various embodiments will be described in detail with reference to the accompanying drawings.

Figure 1:
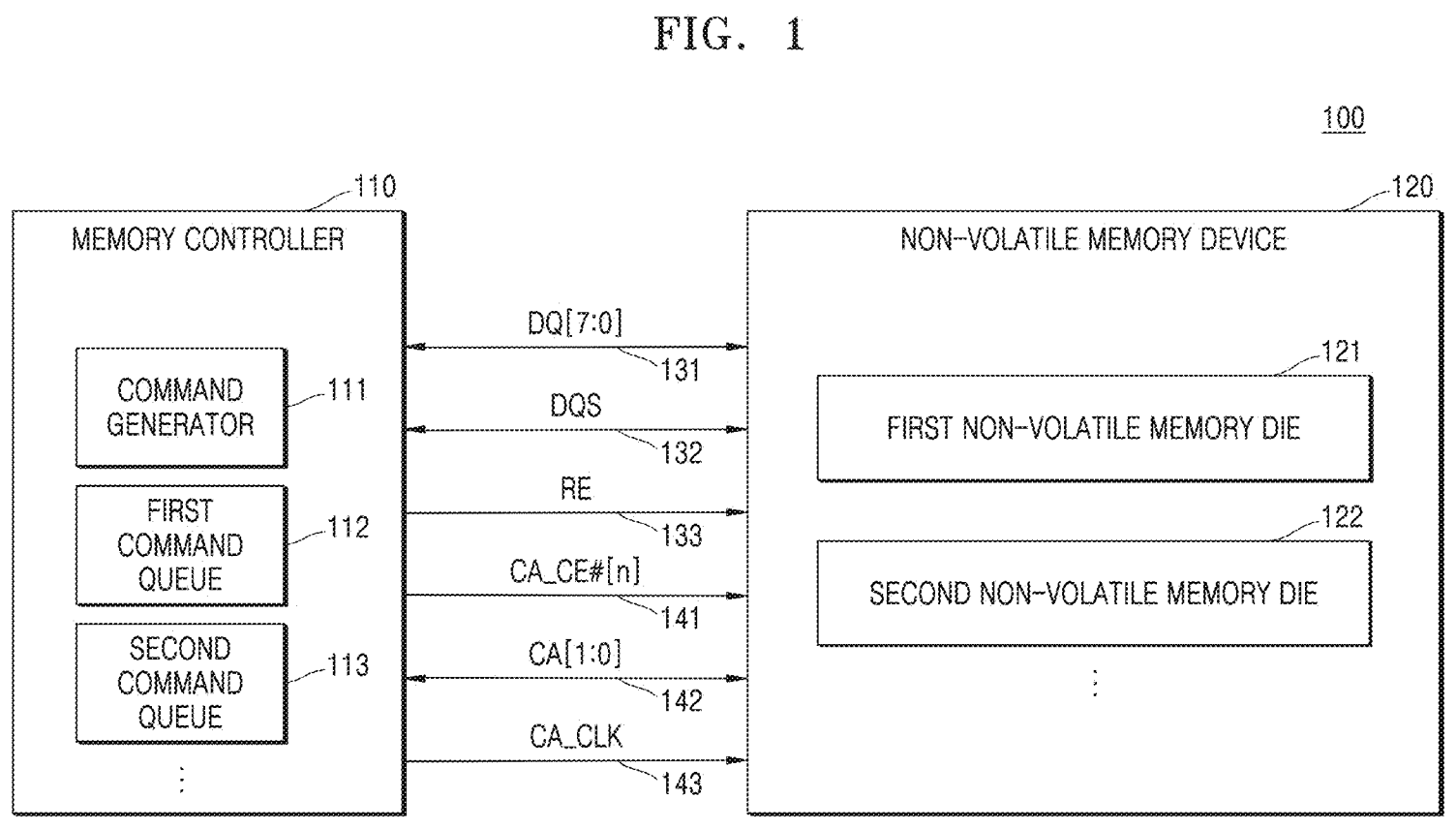

FIG. 1 is a block diagram of a storage device 100 according to an embodiment.

Referring to FIG. 1, the storage device 100 may include a memory controller 110 and a non-volatile memory device 120. In some embodiments, the memory controller 110 and the non-volatile memory device 120 may be integrated into one semiconductor device. For example, according to various embodiments, the memory controller 110 and the non-volatile memory device 120 may be integrated into one semiconductor device to constitute a memory card, a personal computer (PC) card, a compact flash card, a smart media card, a memory stick, a multimedia card, a secure digital (SD) card, a universal flash memory device, or a solid state disk/drive (SSD).

The memory controller 110 may communicate with a host through various standard interfaces. For example, the memory controller 110 may include an interface circuit (not shown), which may provide various standard interfaces between the host and the memory controller 110. The standard interfaces may include various interface methods such as advanced technology attachment (ATA), serial ATA (SATA), external SATA (E-SATA), small computer small interface (SCSI), serial attached SCSI (SAS), peripheral component interconnection (PCI), PCI express (PCI-E), IEEE 1394, universal serial bus (USB), a secure digital (SD) card, a multimedia card (MMC), an embedded multimedia card (eMMC), a universal flash storage (UFS), and/or a compact flash (CF) card interface.

The memory controller 110 may control the non-volatile memory device 120 to read data stored in the non-volatile memory device 120 or to write (or program) data in the non-volatile memory device 120, in response to a request (for example, a read request or a write request) provided by the host. Specifically, the memory controller 110 may be connected to the non-volatile memory device 120 through various buses and may communicate with the non-volatile memory device 120 through various buses. The various buses may include a DQ bus and a CA bus.

In an embodiment, the DQ bus may include a data bus 131, a data strobe bus 132, and a read enable bus 133. However, embodiments are not limited thereto and, in some embodiments, the DQ bus may further include a ready/busy bus. Data signals DQ[7:0] may be transmitted and received through the data bus 131. In an embodiment, the data signals DQ[7:0] may be serially transmitted and received at 7 bits per unit cycle. Here, the unit cycle may correspond to a rising or falling edge of a toggled data strobe signal DQS. The data signals DQ[7:0] transmitted during a plurality of unit cycles may include one data item. The data bus 131 may be a bidirectional bus. The data strobe signal DQS may be transmitted and received through the data strobe bus 132. The data strobe bus 132 may be a bidirectional bus. A read enable signal RE may be transmitted from the memory controller 110 to the non-volatile memory device 120 through the read enable bus 133. The read enable bus 133 may be a unidirectional bus.

In an embodiment, the memory controller 110 may generate the data strobe signal DQS that toggles. For example, the memory controller 110 may generate the data strobe signal DQS that changes from a fixed state (for example, logic high level or logic low level) to a toggle state before transmitting the data signals DQ[7:0]. The memory controller 110 may transmit the data signals DQ[7:0] to the non-volatile memory device 120 based on toggle timings of the data strobe signal DQS.

In an embodiment, the memory controller 110 may generate the read enable signal RE that toggles and may transmit the read enable signal RE to the non-volatile memory device 120. For example, the memory controller 110 may generate the read enable signal RE that changes from a fixed state (for example, logic high level or logic low level) to a toggle state before the data signals DQ[7:0] are output. Accordingly, the non-volatile memory device 120 may generate the data strobe signal DQS that toggles based on the read enable signal RE. The memory controller 110 may receive the data signals DQ[7:0] together with the data strobe signal DQS that toggles from the non-volatile memory device 120. The memory controller 110 may obtain the data signals DQ[7:0] based on a toggle timing of the data strobe signal DQS.

In an embodiment, the CA bus may include a chip enable bus 141, a command address bus 142, and a clock bus 143. The memory controller 110 may transmit at least one chip enable signal CA_CE#[n] to the non-volatile memory device 120 through the chip enable bus 141. In an embodiment, the chip enable signal CA_CE#[n] may include a 1-bit signal, n is a positive integer in n-bit chip enable signals CA_CE#[n], and the number of bits or n may change according to the number of non-volatile memory dies or memory chips included in the non-volatile memory device 120. For example, when there are two non-volatile memory dies, 2-bit chip enable signals CA_CE#[n] may be transmitted through the chip enable bus 141. For example, when the non-volatile memory device 120 includes a first non-volatile memory die 121 and a second non-volatile memory die 122, the memory controller 110 may provide a first chip enable signal CA_CE#[0] and a second chip enable signal CA_CE#[1] to the non-volatile memory device 120 through the chip enable bus 141. The first chip enable signal CA_CE#[0] may enable the first non-volatile memory die 121, and the second chip enable signal CA_CE#[1] may enable the second non-volatile memory die 122. The chip enable bus 141 may be a unidirectional bus.

Command address signals CA[1:0] may be transmitted and received through the command address bus 142. The command address signals CA[1:0] may be transmitted and received at 2 bits per unit cycle. Here, the unit cycle may correspond to the rising or falling edge of a clock signal CA_CLK that toggles. In an embodiment, the command address signals CA[1:0] may include a first command address signal CA[0] and a second command address signal CA[1]. The command address signal may include a command signal, an address signal, and/or a data signal according to a header. The command address bus 142 may be a bidirectional bus.

The memory controller 110 may transmit the clock signal CA_CLK to the non-volatile memory device 120 through the clock bus 143. The clock bus 143 may be a unidirectional bus.

In some embodiments, the CA bus may further include a separate command address (SCA) bus through which a mode selection signal for selecting a NAND interface mode or a SCA interface mode is transmitted. In the NAND interface mode, the command address signal and data are transmitted through the same input/output bus. In the SCA interface mode, the command address signal and data are transmitted through different input/output buses. The SCA interface method may reduce command overhead. The storage device 100 according to an embodiment may operate in the SCA interface method.

In an embodiment, the memory controller 110 may control a series of internal operations (for example, performance control, merge, and wear leveling) used for characteristics of the non-volatile memory device 120 or for efficient management of the non-volatile memory device 120.

In an embodiment, the memory controller 110 may include a command generator 111 and a plurality of command queues. In an embodiment, the number of command queues may be at least two. For example, in some embodiments, the plurality of command queues may include a first command queue 112 and a second command queue 113. However, embodiments are not limited thereto and, in some embodiments, the number of command queues may be three or more.

The command generator 111 may generate the command address signals CA[1:0]. The command generator 111 may enqueue command address packets constituting the command address signals CA[1:0] in a command queue selected from the plurality of command queues. The command generator 111 may dequeue command address packets stored in the plurality of command queues in order.

The first command queue 112 may store a command address packet for the first non-volatile memory die 121. The second command queue 113 may store a command address packet for the second non-volatile memory die 122.

The non-volatile memory device 120 may include a plurality of non-volatile memory dies. Each of the plurality of non-volatile memory dies may be, for example, a storage device configured with flash memories. The flash memory may include, for example, NAND flash memory or NOR flash memory. In an embodiment, the plurality of non-volatile memory dies may be implemented as NAND flash memory.

In an embodiment, the storage device 100 may further include cache memory that may be implemented as volatile memory such as static random access memory (SRAM) or dynamic random access memory (DRAM).

According to the store device 100 of FIG. 1, read performance of the storage device 100 is improved.

FIG. 2 is a diagram illustrating a configuration of a command address packet CA PKT according to an embodiment.

Referring to FIG. 2, the first and second command address signals CA[0] and CA[1] may be transmitted and received while the chip enable signal CA_CE# has a specific logic level. For example, after a certain period of time has passed from when the chip enable signal CA_CE#[n] has a logic low level, the command address signals CA[0] and CA[1] may begin to be transmitted. While the chip enable signal CA_CE#[n] has a logic low level, the first and second command address signals CA[0] and CA[1] may be transmitted at 2 bits per unit cycle. After both the first and second command address signals CA[0] and CA[1] are transmitted, the chip enable signal CA_CE# may have a logic high level.

The first and second command address signals CA[0] and CA[1] may be transmitted at 2 bits per unit cycle, and 12-bit command address signals transmitted for 6 unit cycles UC1 to UC6 may include one command address packet CA PKT.

A header HD of the command address packet CA PKT may be transmitted in a first unit cycle UC1 and a second unit cycle UC2. The header HD may be information specifying the type of the command address packet CA PKT. The header HD may include four bits, that is, a first bit H[0], a second bit H[1], a third bit H[2], and a fourth bit H[3]. For example, in the first unit cycle UC1, the first command address signal CA[0] may include the first bit H[0] of the header HD, and the second command address signal CA[1] may include the second bit H[1] of the header HD. In the second unit cycle UC2, the first command address signal CA[0] may include the third bit H[2] of the header HD, and the second command address signal CA[1] may include the fourth bit H[3] of the header HD.

A body BD of the command address packet CA PKT may be transmitted in a third unit cycle UC3, a fourth unit cycle UC4, a fifth unit cycle UC5, and a sixth unit cycle UC6. The body BD may be information specifying a specific value such as a command, an address, or data. The body BD may include eight bits, that is, a first bit B[0], a second bit B[1], a third bit B[2], a fourth bit B[3], a fifth bit B[4], a sixth bit B[5], a seventh bit B[6], and an eighth bit B[7]. For example, in each of the third to sixth unit cycles UC3, UC4, UC5, and UC6, the first command address signal CA[0] may include first, third, fifth, and seventh bits B[0], B[2], B[4], and B[6], and the second command address signal CA[1] may include second, fourth, sixth, and eighth bits B[1], B[3], B[5], and B[7].

The first and second command address signals CA[0] and CA[1] may be transmitted in synchronization with the rising and falling edges of the clock signal CA_CLK. The first unit cycle UC1 may correspond to a first rising edge of the clock signal CA_CLK. The first and second bits H[0] and H[1] of the header HD may be transmitted in synchronization with the first rising edge of the clock signal CA_CLK. The second unit cycle UC2 may correspond to a first falling edge of the clock signal CA_CLK. The third and fourth bits H[2] and H[3] of the header HD may be transmitted in synchronization with the first falling edge of the clock signal CA_CLK. Likewise, the first and second bits B[0] and B[1] of the body BD may be transmitted in synchronization with a second rising edge of the clock signal CA_CLK corresponding to the third unit cycle UC3. The third and fourth bits B[2] and B[3] of the body BD may be transmitted in synchronization with a second falling edge of the clock signal CA_CLK corresponding to the fourth unit cycle UC4. The fifth and sixth bits B[4] and B[5] of the body BD may be transmitted in synchronization with a third rising edge of the clock signal CA_CLK corresponding to the fifth unit cycle UC5. The seventh and eighth bits B[6] and B[7] of the body BD may be transmitted in synchronization with a third falling edge of the clock signal CA_CLK corresponding to the sixth unit cycle UC6.

FIG. 3 is a diagram illustrating a type of a command address packet CA PKT according to an embodiment.

Referring to FIGS. 2 and 3, the type of the command address packet CA PKT may be specified according to logic levels of the header HD synchronized at each of the rising and falling edges of the clock signal CA_CLK, as described above.

For example, when the first to fourth bits H[0], H[1], H[2], and H[3] of the header HD are all at a logic low level, the type of the command address packet CA PKT may be a command address data output CA Data Output. The command address data output CA Data Output may indicate that a value of the body BD of the command address packet CA PKT is data transmitted from the non-volatile memory device 120 to the memory controller 110 through the command address bus 142. The body BD of the command address packet CA PKT specifying the command address data output CA Data Output may include specific values of data to be received by the memory controller 110 through the command address bus 142.

For example, when only the third bit H[2] of the first to fourth bits H[0], H[1], H[2], and H[3] of the header HD is at a logic high level, the type of the command address packet CA PKT may be a command address data input CA Data Input. The command address data input CA Data Input may indicate that a value of the body BD of the command address packet CA PKT is data transmitted from the memory controller 110 to the non-volatile memory device 120 through the command address bus 142. The body BD of the command address packet CA PKT specifying the command address data input CA Data Input may include specific values of data to be received by the non-volatile memory device 120 through the command address bus 142.

For example, when only the first bit H[0] of the first to fourth bits H[0], H[1], H[2], and H[3] of the header HD is at a logic high level, the type of the command address packet CA PKT may be an address Address. The command address packet CA PKT specifying the address Address may be referred to as an address packet. A body BD of the address packet may include specific values of the address.

For example, when only the second bit H[1] of the first to fourth bits H[0], H[1], H[2], and H[3] of the header HD is at a logic high level, the type of the command address packet CA PKT may be a command Command. In an embodiment, the command Command may include a read command, a write command, and an erase command. The command address packet CA PKT specifying the command Command may be referred to as a command packet. A body BD of the command packet may include specific values of the command.

For example, when the first and second bits H[0] and H[1] of the header HD are at a logic high level and the third and fourth bits H[2] and H[3] of the header HD are at a logic low level, the type of the command address packet CA PKT may be logical unit number (LUN) selection LUNSel. The LUN selection LUNSel is a selection of a specific LUN, and one LUN may correspond to one non-volatile memory die. A body BD of an LUN selection packet may include specific values indicating an LUN to be selected. In some embodiments, the LUN selection LUNSel may be omitted.

For example, when only the fourth bit H[3] of the first to fourth bits H[0], H[1], H[2], and H[3] of the header HD is at a logic low level, the type of the command address packet CA PKT may be select chip enable (SCE). The SCE may be information for connecting the memory controller 110 to any one non-volatile memory die through the data bus 131. The command address packet CA PKT specifying the SCE may be referred to as an SCE packet. A body BD of the SCE packet may include die information indicating an address of an LUN to be selected, burst direction information indicating a burst direction, delay information on output timing of data. An embodiment of the body BD of the SCE packet is described below with reference to FIGS. 5 and 6.

For example, when only the third bit H[2] of the first to fourth bits H[0], H[1], H[2], and H[3] of the header HD is at a logic low level, the type of the command address packet CA PKT may be select chip pause (SCP). The SCP may be information letting the non-volatile memory die connected to the data bus 131 remain in a ready state while activating the non-volatile memory die to perform another operation. The command address packet CA PKT specifying the SCP may be referred to as an SCP packet. A body BD of the SCP packet may include values indicating an address of an LUN to be selected.

For example, when the first to fourth bits H[0], H[1], H[2], and H[3] of the header HD are all at a logic high level, the type of the command address packet CA PKT may be select chip terminate (SCT). The SCT may be information letting the non-volatile memory die connected to the data bus 131 enter a low-power mode when the non-volatile memory die does not need to perform another operation. The command address packet CA PKT specifying the SCT may be referred to as an SCT packet. A body BD of the SCT packet may include values indicating an address of an LUN to be selected.

Figure 4:
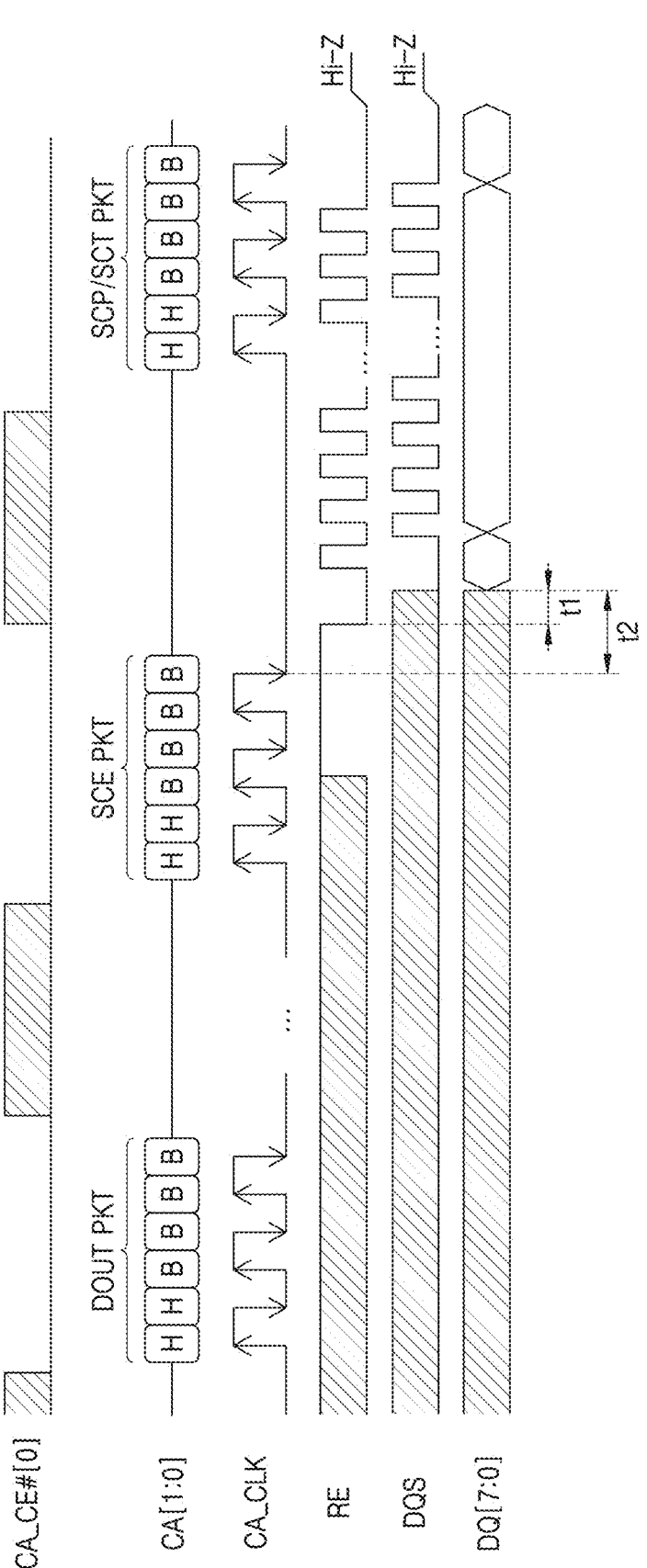
FIG. 4 is a timing diagram illustrating an example of an operation of a storage device according to an embodiment.

FIG. 4 is a timing diagram illustrating an example of an operation of a storage device 100 according to an embodiment. Specifically, FIG. 4 is a timing diagram illustrating an operation of any one non-volatile memory die outputting data to the memory controller 110. Hereinafter, it is assumed that the any one non-volatile memory die of FIG. 4 is the first non-volatile memory die 121.

Referring to FIG. 4, the memory controller 110 may transmit the first chip enable signal CA_CE#[0] having an enable level (for example, a logic low level) to the first non-volatile memory die 121. The memory controller 110 may output the clock signal CA_CLK that toggles and may transmit the first and second command address signals CA[0] and CA[1] constituting header bits H or body bit B of the data output command packet DOUT PKT in synchronization with edges of the clock signal CA_CLK to the first non-volatile memory die 121. The data output command packet DOUT PKT may specify a data output command. The data output command may instruct the non-volatile memory device 120 to output internal data read from the non-volatile memory die 121 to the outside of the non-volatile memory device 120. The data output command corresponds to a DQ bus-related command. In order for the non-volatile memory die, for example, the first non-volatile memory die 121, to read internal data, a read command packet may be transmitted to the first non-volatile memory die 121 before the data output command packet DOUT PKT is transmitted to the first non-volatile memory die 121. After transmission of the data output command packet DOUT PKT is completed, the memory controller 110 may transmit the first chip enable signal CA_CE#[0] having a disable level (for example, a logic high level) to the first non-volatile memory die 121 or may not transmit the first chip enable signal CA_CE#[0] to the first non-volatile memory die 121.

The memory controller 110 may transmit the first chip enable signal CA_CE#[0] having a logic low level to the first non-volatile memory die 121. The memory controller 110 may transmit the first and second command address signals CA[0] and CA[1] constituting the SCE packet SCE PKT to the first non-volatile memory die 121 in synchronization with edges of the clock signal CA_CLK. After the clock signal CA_CLK begins to be output, the read enable signal RE having a logic high level may be transmitted, and after a first predetermined time, the logic level of the read enable signal RE changes from the logic high level to a logic low level, and after the logic low level of the read enable signal RE has been maintained for a second predetermined time, the read enable signal RE may begin to be toggled. Meanwhile, the data strobe signal DQS may have a logic low level after a first time t1 has passed from a point in time at which the logic level of the read enable signal RE changes from the logic high level to the logic low level, and the data strobe signal DQS may begin to toggle after the logic low level of the read enable signal RE has been maintained for the second predetermined time. In some embodiments, the first and second predetermined times may be different. In some embodiments, the first and second predetermined times may be the same. Meanwhile, the data signals DQ[7:0] may be transmitted from the first non-volatile memory die 121 to the memory controller 110 after a preamble time (for example, a second time t2) has passed from a point in time at which the first and second command address signals CA[0] and CA[1] constituting the last bodies B (for example, the sixth and seventh bits of the body BD) of the SCE packet SCE PKT are transmitted. That is, the data signals DQ[7:0] start to be output after the preamble time (for example, the second time t2) has passed from a point in time at which the SCE packet SCE PKT is output. The data signals DQ[7:0] transmitted during a plurality of cycles of the data strobe signal DQS may include data.

The memory controller 110 may transmit the first and second command address signals CA[0] and CA[1] constituting an SCP packet or an SCT packet (referred to as an SCP/SCT PKT) to the first non-volatile memory die 121 in synchronization with the toggled clock signal CA_CLK while the first chip enable signal CA_CE#[0] has a logic low level. The SCP/SCT packet SCP/SCT PKT may be any one of the SCP packet or the SCT packet. After the SCP/SCT packet SCP/SCT PKT is transmitted and the output of the data signals DQ[7:0] is completed, the data strobe bus 132 and the read enable bus 133 transmitting the read enable signal RE and the data strobe signal DQS may be in a high impedance Hi-Z state.

Figure 5:
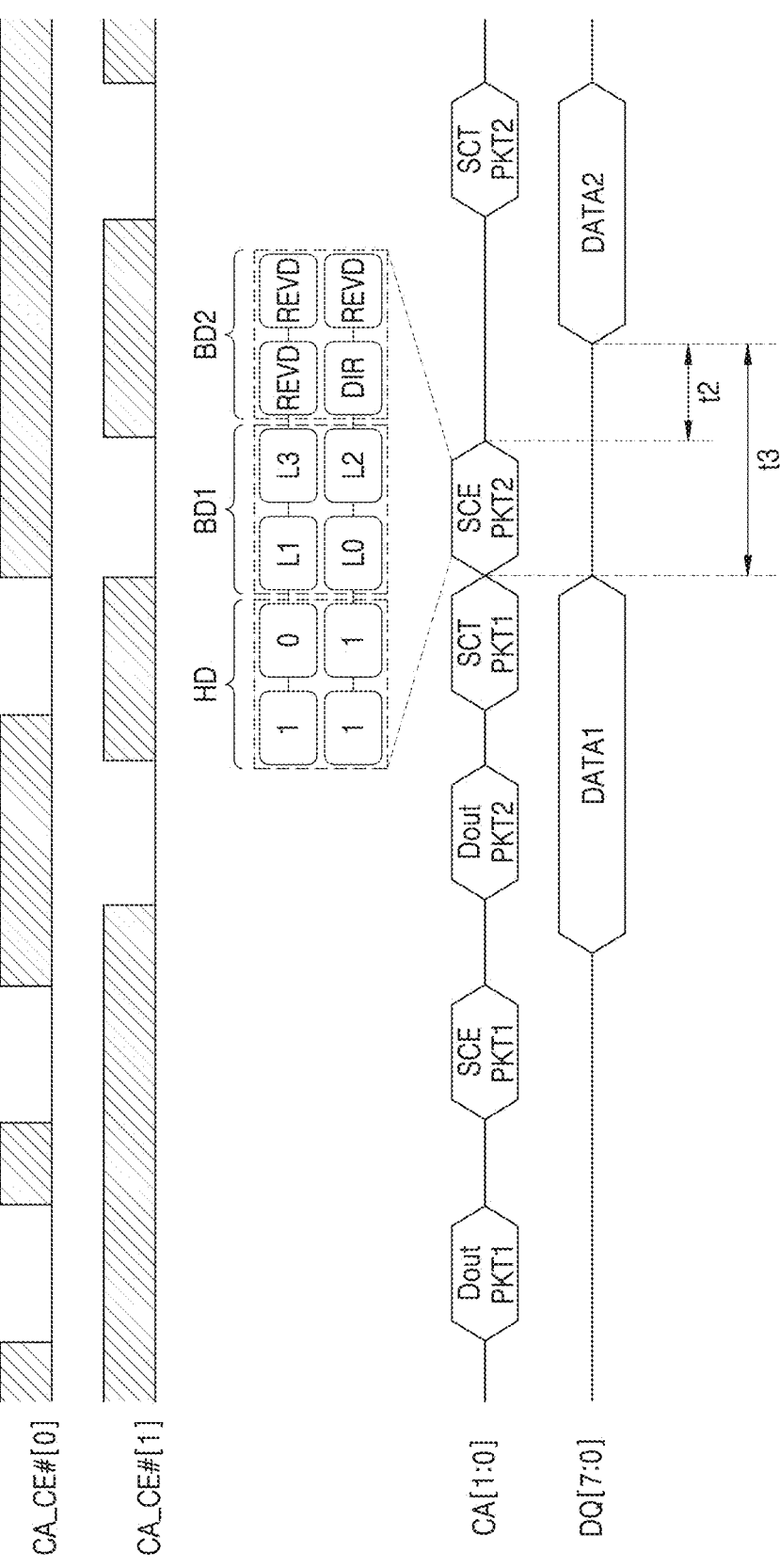
FIGS. 5, 6, and 7 are timing diagrams illustrating examples of operations of a storage device according to some embodiments.
Figure 6:
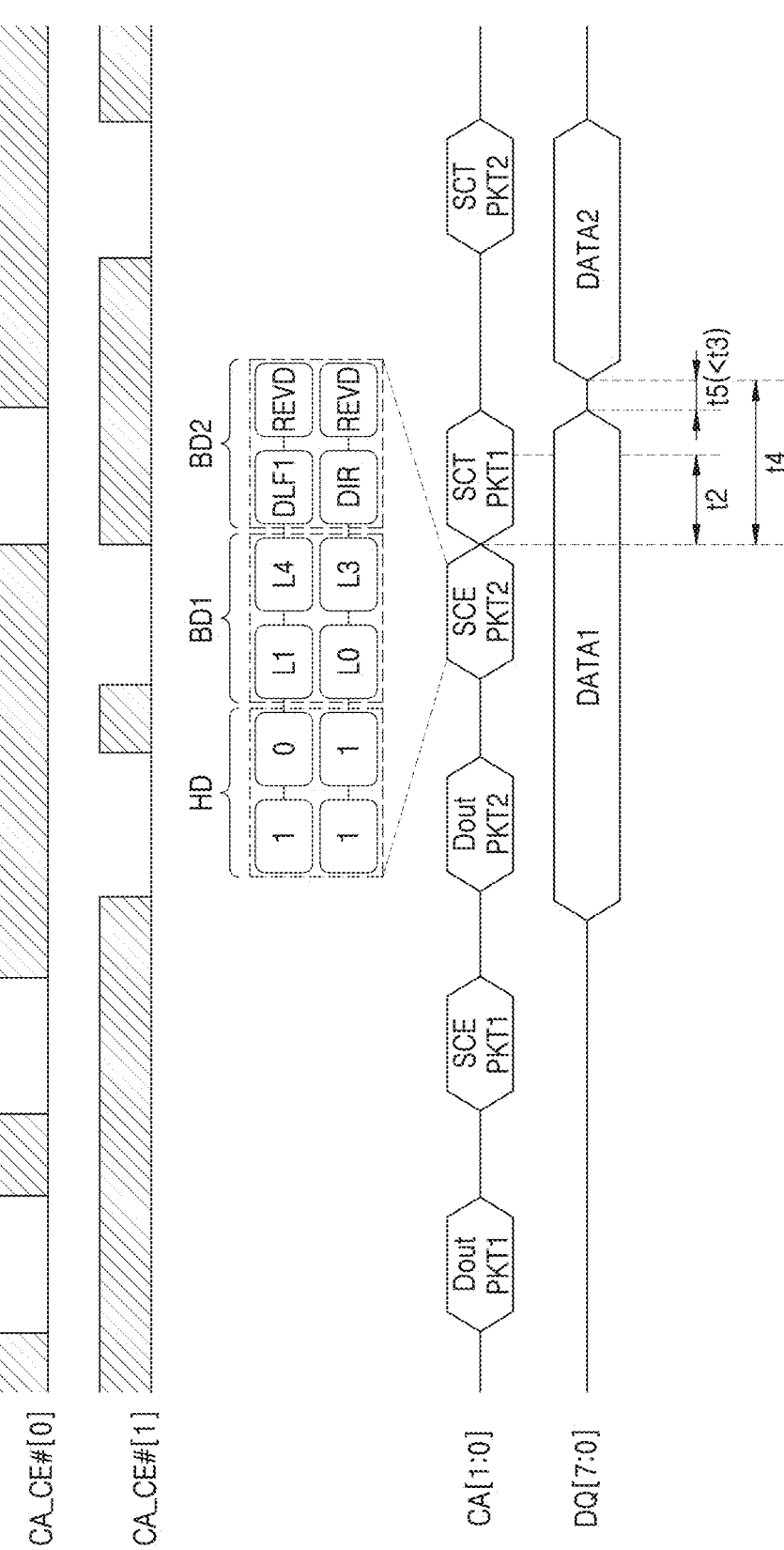
Figure 7:
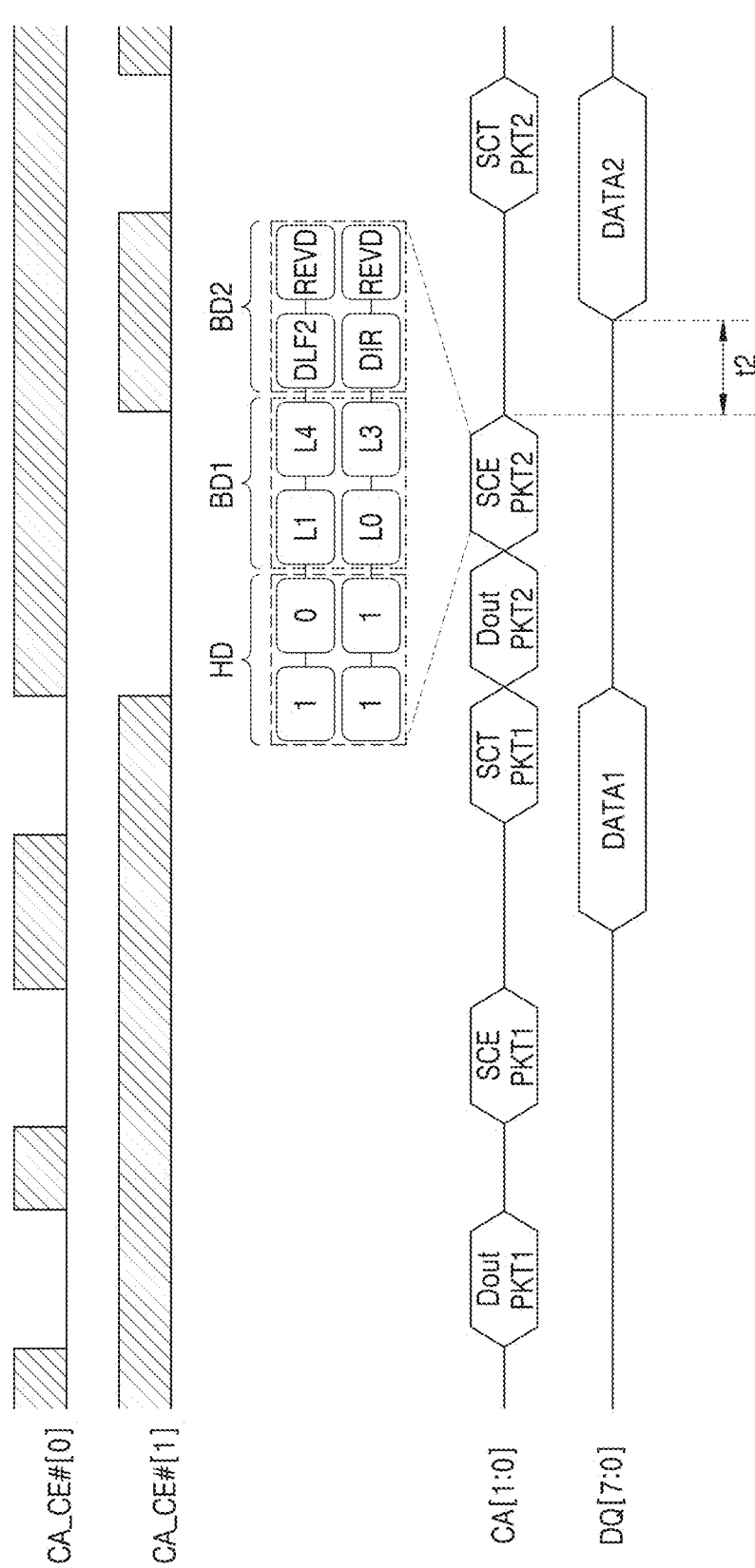

FIGS. 5, 6, and 7 are timing diagrams illustrating examples of operations of a storage device 100 according to some embodiments. Specifically, FIGS. 5, 6, and 7 are timing diagrams illustrating a comparative example according to the related art and examples according to embodiments in which at least two non-volatile memory dies selected from a plurality of non-volatile memory dies output data to the memory controller 110 in an interleaved manner. FIG. 5 is a timing diagram illustrating the comparative example according to the related art, and FIGS. 6 and 7 are timing diagrams illustrating examples according to embodiments. Hereinafter, it is assumed that the non-volatile memory dies selected in FIGS. 5, 6, and 7 are the first and second non-volatile memory dies 121 and 122.

Referring to FIGS. 5, 6, and 7, a first data output command packet Dout PKT1, a first SCE packet SCE PKT1, and a first SCT packet SCT PKT1 may be the command address packet CA PKT for the first non-volatile memory die 121, and first data DATA1 may be output by the first non-volatile memory die 121. A second data output command packet Dout PKT2, a second SCE packet SCE PKT2, and a second SCT packet SCT PKT2 may be the command address packet CA PKT for the second non-volatile memory die 122, and second data DATA2 may be output by the second non-volatile memory die 122. When the command address packet CA PKT for a specific non-volatile memory die is transmitted to the non-volatile memory device 120, a corresponding chip enable signal may have an enable level. For example, when the first data output command packet Dout PKT1, the first SCE packet SCE PKT1, and the first SCT packet SCT PKT1 are transmitted to the non-volatile memory device 120, the first chip enable signal CA_CE#[0] may have a logic low level. For example, when the second data output command packet Dout PKT2, the second SCE packet SCE PKT2, and the second SCT packet SCT PKT2 are transmitted to the non-volatile memory device 120, the second chip enable signal CA_CE#[1] may have a logic low level. The memory controller 110 may independently set data output periods of the first and second non-volatile memory dies 121 and 122 by transmitting the first and second SCE packets SCE PKT1 and SCE PKT2 and the first and second SCT packets SCT PKT1 and SCT PKT2 to the first and second non-volatile memory dies 121 and 122. Although the SCT packet SCT PKT is illustrated in FIGS. 5, 6, and 7, the following description similarly applies to a configuration in which the SCP packet SCP PKT is transmitted to the non-volatile memory device 120 instead of the SCT packet SCT PKT.

Referring to FIG. 5, after the first data output command packet Dout PKT1 is output, the first SCE packet SCE PKT1 may be output. After the first SCE packet SCE PKT1 is output, the first data DATA1 may be transmitted to the memory controller 110 through the data bus 131. At a point in time at which transmission of the first data DATA1 is completed, the first SCT packet SCT PKT1 may be transmitted to the non-volatile memory device 120. In the comparative example according to the related art, the second data output command packet Dout PKT2 may be transmitted to the non-volatile memory device 120 before the first SCT packet SCT PKT1 is output, and the second SCE PKT2 may be transmitted to the non-volatile memory device 120 after the first SCT packet SCT PKT1 is output. The second SCE packet SCE PKT2 according to the comparative example may include a header HD, a first body BD1, and a second body BD2. The first body BD1 of the second SCE packet SCE PKT2 may include four bits (for example, B[0], B[1], B[2], and B[3]) as described above with reference to FIG. 2 and may include values specifying the second non-volatile memory die 122, for example, values L0, L1, L2, and L3 indicating an LUN corresponding to the second non-volatile memory die 122. The second body BD2 of the second SCE packet SCE PKT2 may include four bits (for example, B[4], B[5], B[6], and B[7]) as described above with reference to FIG. 2 and may include a burst direction bit DIR indicating a burst direction. For example, the fifth bit B[4] of the second body BD2 of the second SCE packet SCE PKT2 may indicate the burst direction bit DIR. The burst direction may include a data output direction or a data input direction. Data may be transmitted from the memory controller 110 to the non-volatile memory device 120 in the data input direction, and data may be transmitted from the non-volatile memory device 120 to the memory controller 110 in the data output direction. Sixth to eighth bits (for example, B[5], B[6], and B[7]) of the second body BD2 of the second SCE packet SCE PKT2 as a reserved field REVD may be a meaningless value (for example, "0"). Meanwhile, as described above with reference to FIG. 4, the second data output command packet Dout PKT2 and the second SCE packet SCE PKT2 may be sequentially transmitted to the non-volatile memory device 120, and the second data DATA2 may be transmitted from the second non-volatile memory die 121 to the memory controller 110 after a predetermined time (for example, the second time t2) has passed from a point in time at which the second SCE packet SCE PKT2 is output. Accordingly, because the second data DATA2 is transmitted after a predetermined time (for example, a third time t3) has passed from the point in time at which transmission of the first data DATA1 is completed, a relatively long output delay period (or a pause period) corresponding to the third time t3 may occur between data outputs, and overhead may occur due to the output delay period. The second SCT packet SCT PKT2 may be transmitted to the non-volatile memory device 120 at a point in time at which transmission of the second data DATA2 is completed.

Referring to FIG. 6, the first data output command packet Dout PKT1, the first SCE packet SCE PKT1, the first data DATA1, and the first SCT packet SCT PKT1 may be output as described above with reference to FIG. 5 and a repeated description thereof is omitted for conciseness. In an embodiment, the second data output command packet Dout PKT2 may be transmitted to the non-volatile memory device 120 before the first SCT packet SCT PKT1 is output. Like the second SCE packet SCE PKT2 of FIG. 5, the second SCE packet SCE PKT2 according to an embodiment may include a header HD, a first body BD1, and a second body BD2. Unlike the second SCE packet SCE PKT2 of FIG. 5, at least one of the sixth to eighth bits (for example, B[5], B[6], and B[7]) of the second body BD2 of the second SCE packet SCE PKT2 of FIG. 6 may indicate delay information for an output timing of the second data DATA2. In other words, one of the bits for the reserved field REVD may be used to indicate the delay information. The delay information may be a delay flag and may be a first logic value (for example, "0") or a second logic value (for example, "1"). Referring to FIG. 6, for example, the sixth bit (for example, B[5]) of the second body BD2 may indicate a first delay flag DLF1 determining whether to further delay an output point in time of data, and the seventh and eighth bits (for example, B[6] and B[7]) may be a reserved field REVD. The first delay flag DLF1 may be a first logic value (for example, "0") or a second logic value (for example, "1"), and the second logic value (for example, "1") may indicate that the output point in time of data is further delayed by a preset delay time and the first logic value (for example, "0") may indicate that the output point in time of data is not further delayed by the preset delay time. The second non-volatile memory die 122 may determine whether to delay the output point in time of the second data DATA2 by the preamble time (for example, the second time t2) or whether to further delay the output point in time of the second data DATA2 by the preset delay time in addition to the preamble time according to the logic value of the first delay flag DLF1. It is assumed in FIG. 6 that the first delay flag DLF1 has the second logic value indicating to further delay the output point in time of the second data DATA2 by the preset delay time in additional to the preamble time. In this case, the second non-volatile memory die 122 may output the second data DATA2 after the preamble time (for example, the second time t2) and the preset delay time. For example, in an embodiment, the second non-volatile memory die 122 may output the second DATA2 after a fourth time t4 has passed from the point in time at which the second SCE packet SCE PKT2 is output. Here, the fourth time t4 may include the preamble time t2 and the preset delay time. As a result, a fifth time t5 between the point in time at which the transmission of the first data DATA1 is completed and the point in time at which the transmission of the second data DATA2 begins may be less than the third time t3 of FIG. 5. Therefore, according to the embodiment illustrated in FIG. 6, an output delay period (or a pause period) between data outputs may be reduced, overhead may be improved, and I/O bound performance may be improved. Meanwhile, unlike illustrated in FIG. 5, values of the sixth to eighth bits (for example, B[5], B[6], and B[7]) of the second body BD2 of the second SCE packet SCE PKT2 of FIG. 6 according to an embodiment may indicate detailed delay time information. In this case, the second non-volatile memory die 122 may delay the output point in time of the second data DATA2 by a fourth time t4 from the output point in time of the second SCE packet SCE PKT2 based on the values of the sixth to eighth bits (for example, B[5], B[6], and B[7]) of the second body BD2 of the second SCE packet SCE PKT2. The second SCT packet SCT PKT2 may be transmitted to the non-volatile memory device 120 at the point in time at which the transmission of the second data DATA2 is completed.

Referring to FIG. 7, in the embodiment illustrated in FIG. 7, the second data output command packet Dout PKT2 may be transmitted to the non-volatile memory device 120 after the first SCT packet SCT PKT1 is transmitted to the non-volatile memory device 120. After the second data output command packet Dout PKT2 is output, the second SCE packet SCE PKT2 may be transmitted to the non-volatile memory device 120. In this case, like the second SCE packet SCE PKT2 of FIG. 6, at least one of the sixth to eighth bits (for example, B[5], B[6], and B[7]) of the second body BD2 of the second SCE packet SCE PKT2 may indicate delay information on output timing of the second data DATA2. Referring to FIG. 7, for example, the sixth bit (for example, B[5]) of the second body BD2 may indicate a second delay flag DLF2, and the seventh and eighth bits (for example, B[6] and B[7]) of the second body BD2 may be a reserved field REVD. It is assumed in FIG. 7 that the second delay flag DLF2 has the first logic value indicating not to further delay the output point in time of the second data DATA2 by the preset delay time in additional to the preamble time. In other words, the logic value of the second delay flag DLF2 may be different from the logic value of the first delay flag DLF1 illustrated in FIG. 6 and may not indicate to add the preset delay time. For example, the logic value of the second delay flag DLF2 may be the first logic value (for example, "0"). The second non-volatile memory die 122 may transmit the second data DATA2 to the memory controller 110 at a default timing illustrated in FIG. 4, that is, after the preamble time (for example, the second time t2) has passed from the point in time at which the second SCE packet SCE PKT2 is output based on the sixth bit (for example, B[5]) of the second SCE packet SCE PKT2 and without the further delay by the preset delay time. In other words, since in this case the second data output command packet Dout PKT2 is transmitted to the non-volatile memory device 120 after the first SCT packet SCT PKT1 is transmitted to the non-volatile memory device 120 and the transmission of the first data DATA1 has been completed, there is no need for further delay according to the preset delay time and thus the second delay flag DLF2 may be used to indicate the default delay of FIG. 4. In another embodiment, values of the sixth to eighth bits (for example, B[5], B[6], and B[7]) of the second body BD2 of the second SCE packet SCE PKT2 of FIG. 7 may indicate detailed delay time information. According to the embodiment illustrated in FIG. 7, there is an effect of improving overhead for data output. The second SCT packet SCT PKT2 may be transmitted to the non-volatile memory device 120 at the point in time at which the transmission of the second data DATA2 is completed.

Although embodiments are described based on the first and second non-volatile memory dies 121 and 122 in FIGS. 6 and 7, embodiments are not limited thereto. For example, while the second data DATA2 is transmitted to the memory controller 110, like the second data output packet Dout PKT2 and the second SCE packet SCE PKT2 of FIG. 6, a data output packet and an SCE packet for any non-volatile memory die different from the second non-volatile memory die 122 may be transmitted to the non-volatile memory device 120. In this case, the SCE packet for the non-volatile memory die may include the first delay flag DLF1. For example, like the second data output packet Dout PKT2 and the second SCE packet SCE PKT2 of FIG. 7, after the second SCT packet SCT PKT2 is transmitted to the non-volatile memory device 120, data output packets and SCE packets for any non-volatile memory die including the second non-volatile memory die 122 may be transmitted to the non-volatile memory device 120. In this case, the SCE packet for the non-volatile memory die may include the second delay flag DLF2.

Figure 8:
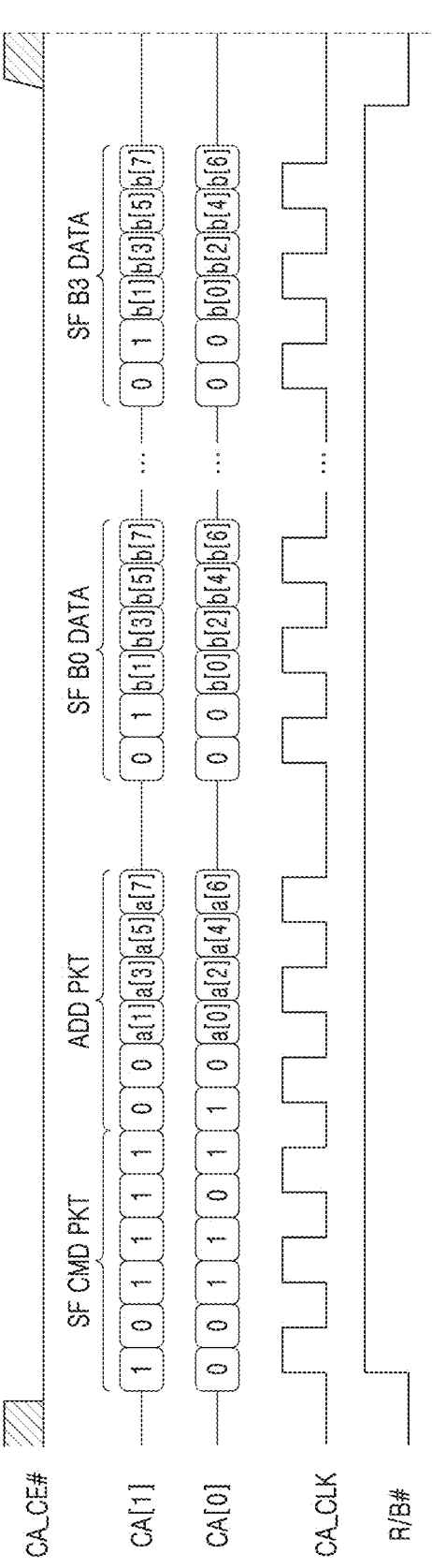
FIG. 8 is a timing diagram illustrating setting delay time information on a non-volatile memory die, according to an embodiment.

FIG. 8 is a timing diagram illustrating setting delay time information on a non-volatile memory die, according to an embodiment.

Referring to FIG. 8, when a delay flag is included as delay information in the second body BD2 of the SCE packet SCE PKT according to various embodiments, the delay flag indicates whether or not to delay an output point in time of data. A specific setting value for how much to delay the output point in time of the data, that is, delay time information, is stored in the non-volatile memory die and, when a specific logic value of the delay flag is received, the non-volatile memory die may delay the output point in time of the data by using the previously stored setting value. In an embodiment in which the setting value is stored in the non-volatile memory die, after transmitting the chip enable signal CA_CE#[n] having the enable level to the non-volatile memory device 120, the memory controller 110 may transmit the first and second command address signals CA[1] and CA[0] constituting a set feature command packet SF CMD PKT and an address packet ADD PKT to the non-volatile memory device 120 in synchronization with edges of the clock signal CA_CLK. The set feature command packet SF CMD PKT may specify a set feature command. For example, a header of the set feature command packet SF CMD PKT may be "0100" (see FIG. 3), and a body of the set feature command packet SF CMD PKT may be "11110111" ("EFh"). A header of the address packet ADD PKT may be "1000", and a body of the address packet ADD PKT may be any "a[7:0]". The set feature command packet SF CMD PKT and the address packet ADD PKT may be transmitted to the non-volatile memory device 120 when a computing system including the storage device 100 is booted or when a request from a host occurs in a running computing system. For example, in an embodiment, the request from the host may be for setting delay information based on a user request. However, embodiments are not limited thereto.

After the set feature command packet SF CMD PKT and the address packet ADD PKT are output, the memory controller 110 may transmit a plurality of set feature data items SF B0 DATA, . . . , to SF B3 DATA to the non-volatile memory device 120 in synchronization with edges of the clock signal CA_CLK. A header of each of the plurality of set feature data items SF B0 DATA, . . . , to SF B3 DATA may be "0001", and a body of each of the plurality of set feature data items SF B0 DATA, . . . , to SF B3 DATA may be any "b[7:0]". At least some of the plurality of set feature data items SF B0 DATA, . . . , to SF B3 DATA may include delay time information. A specific non-volatile memory die of the non-volatile memory device 120 may set the delay time information for the specific non-volatile memory die by storing the plurality of set feature data items SF B0 DATA, . . . , to SF B3 DATA. In an embodiment, the value of the delay time information may be stored in an internal register of the specific non-volatile memory die.

A ready busy signal R/B# may have a logic high level while the set feature command packet SFCMD PKT, the address packet ADD PKT, and the plurality of set feature data items SF B0 DATA, . . . , to SF B3 DATA are transmitted to the non-volatile memory die.

FIGS. 9, 10, 11, 12, and 13 are diagrams illustrating operations of a memory controller 110 according to some embodiments. It is assumed in FIGS. 9, 10, 11, 12, and 13 that the number of command queues is two. However, embodiments are not limited thereto.

Figure 9:
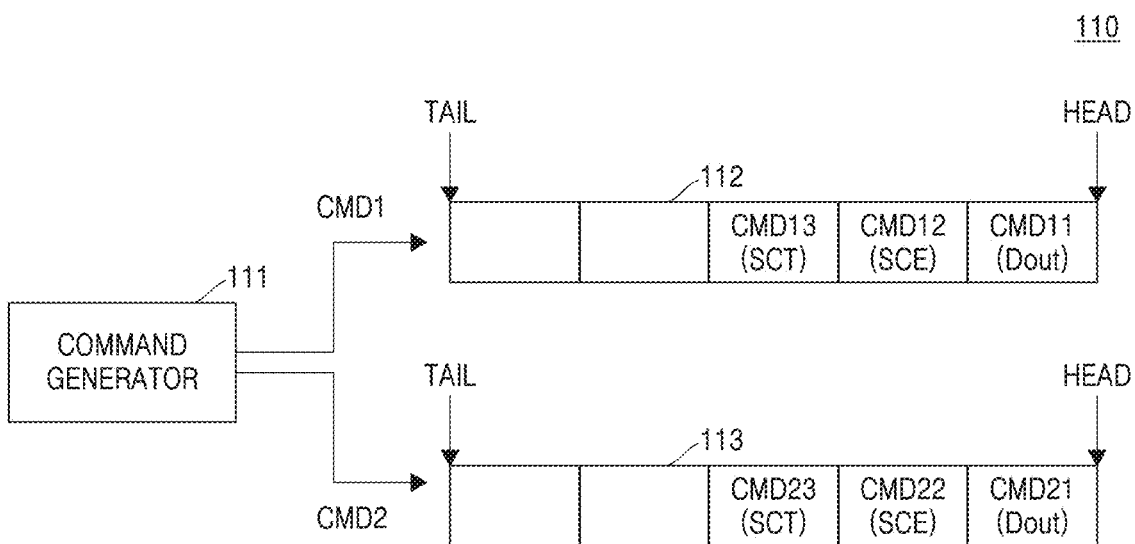
FIGS. 9, 10, 11, 12, and 13 are diagrams illustrating operations of a memory controller according to some embodiments.

Referring to FIG. 9, in an embodiment, among a plurality of command queues included in the memory controller 110, a first command queue 112 may store a command constituting a first command address packet for the first non-volatile memory die 121, and a second command queue 113 may store a command constituting a second command address packet for the second non-volatile memory die 122. Each of the first and second command queues 112 and 113 may store commands in the order from a head HEAD to a tail TAIL, and may sequentially output commands stored first. That is, the first and second command queues may be a first-in and first-out (FIFO) data structure. The command generator 111 included in the memory controller 110 may generate a first command CMD1 and/or a second command CMD2, may enqueue the first command CMD1 and/or the second command CMD2 in the first and/or second command queues 112, 113, and may dequeue the command stored in the first and/or second command queues 112, 113 according to the scheduled order. For example, a plurality of first commands CMD11, CMD12, and CMD13 may be stored in the first command queue 112, and a plurality of second commands CMD21, CMD22, and CMD23 may be stored in the second command queue 113. In an embodiment, the commands CMD11 and CMD21 may indicate data output commands, the commands CMD12 and CMD22 may indicate the SCE, and the commands CMD13 and CMD23 may indicate the SCT. In another embodiment, the commands CMD13 and CMD23 may indicate the SCP instead of the SCT. Although not shown, a set feature command, the read command, and a read state command may be further stored in the first and second command queues 112 and 113. The set feature command, the read command, and the read state command correspond to non-DQ bus-related commands.

In an embodiment, the command generator 111 may sequentially dequeue the first data output command packet and a first select chip enable packet in the first command queue 112 during a first period. In addition, the command generator 111 may sequentially dequeue the second data output command packet and the second select chip enable packet from the second command queue 113 during a second period. In an embodiment, the second period may be after the first period. In some embodiments, the command generator 111 may dequeue a first select chip terminate command packet from the first command queue 112 after the second select chip enable packet is output.

In an embodiment, the memory controller 111 may receive the first data from the first non-volatile memory die during the second period. The command generator 111 may dequeue the first select chip terminate command packet from the first command queue 112 when reception of the first data is completed.

In an embodiment, the command generator 111 may dequeue the first select chip terminate command packet from the first command queue 112 when a preset reference time has passed from a point in time at which the first select chip enable packet is output.

In an embodiment, the command generator 111 may generate a second select chip terminate command packet, may enqueue the second select chip terminate command packet in the second command queue 113, and may dequeue the second select chip terminate command packet from the second command queue 113 after a point in time at which the first select chip terminate command packet is output.

In an embodiment, the command generator 111 may generate the second data output command packet and the second select chip enable packet, may change first delay information of the second data output command packet to second delay information including a second delay time less than a first delay time of the first delay information, may sequentially enqueue the second select chip terminate command packet, the second data output command packet, and the second select chip enable packet in the second command queue, and may dequeue the second data output command packet and the second select chip enable packet from the second command queue after the point in time at which the second select chip terminate command packet is output.

Figure 10:
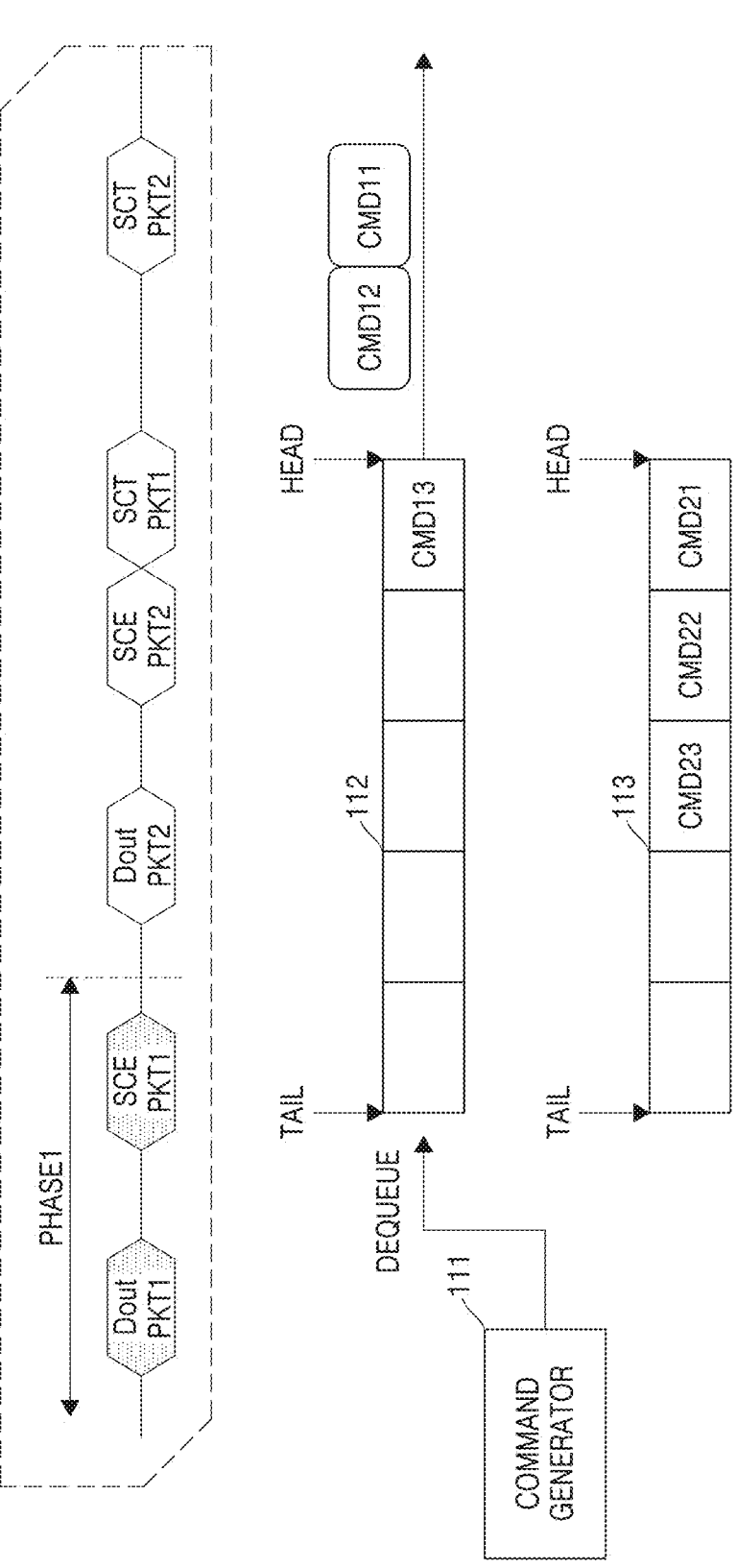

Referring to FIGS. 6 and 10, in a first phase PHASE1, the first data output command packet Dout PKT1 and the first SCE packet SCE PKT1 may be sequentially transmitted to the first non-volatile memory die 121. To this end, in the first phase PHASE1, the command generator 111 may sequentially dequeue from the first command queue 112 the commands CMD11 and CMD12 stored in the first command queue 112.

Figure 11:
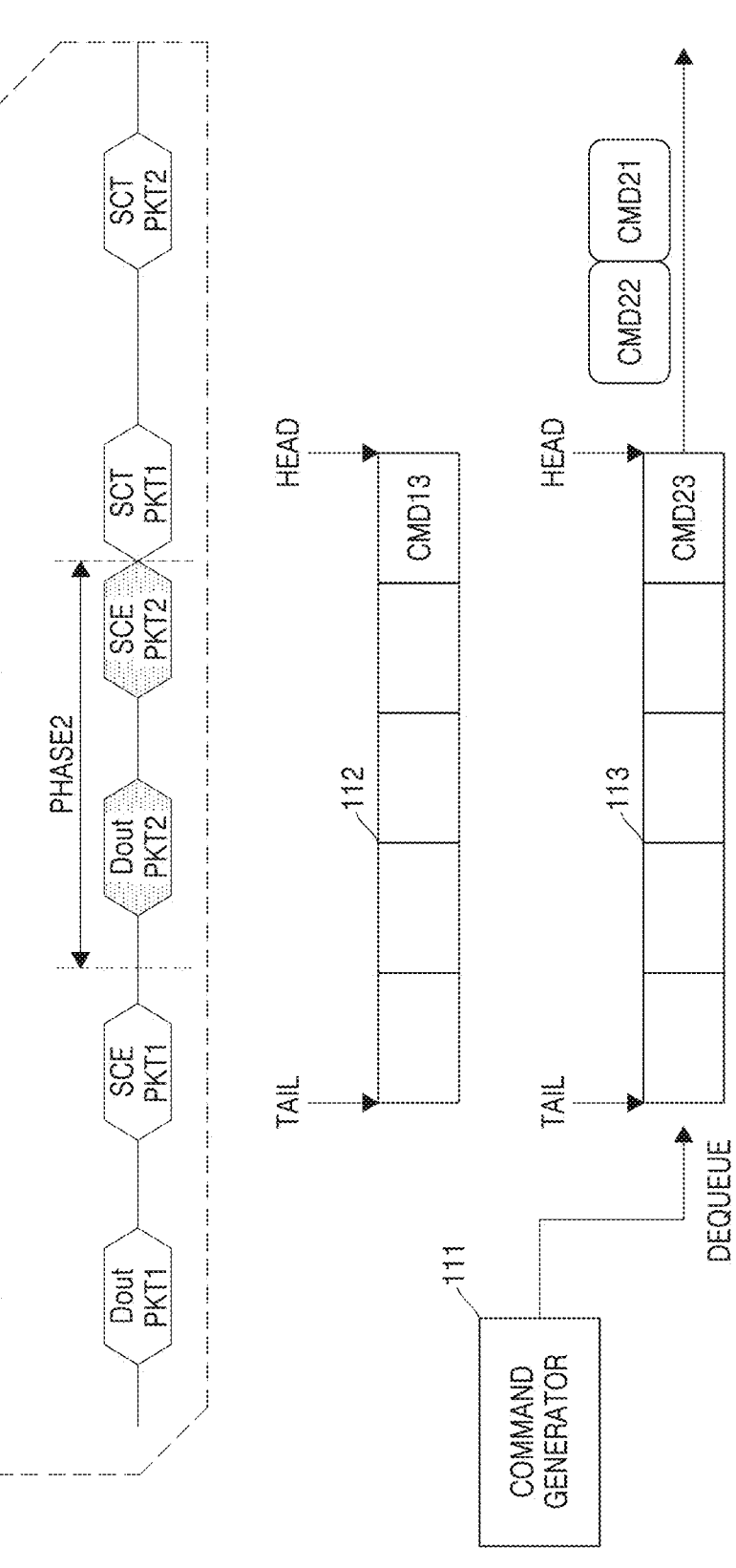

Referring to FIGS. 6 and 11, in a second phase PHASE2, the second data output command packet Dout PKT2 and the second SCE packet SCE PKT2 may be sequentially transmitted to the second non-volatile memory die 122. To this end, in the second phase PHASE2, the command generator 111 may sequentially dequeue from the second command queue 113 the commands CMD21 and CMD22 stored in the second command queue 113.

Figure 12:
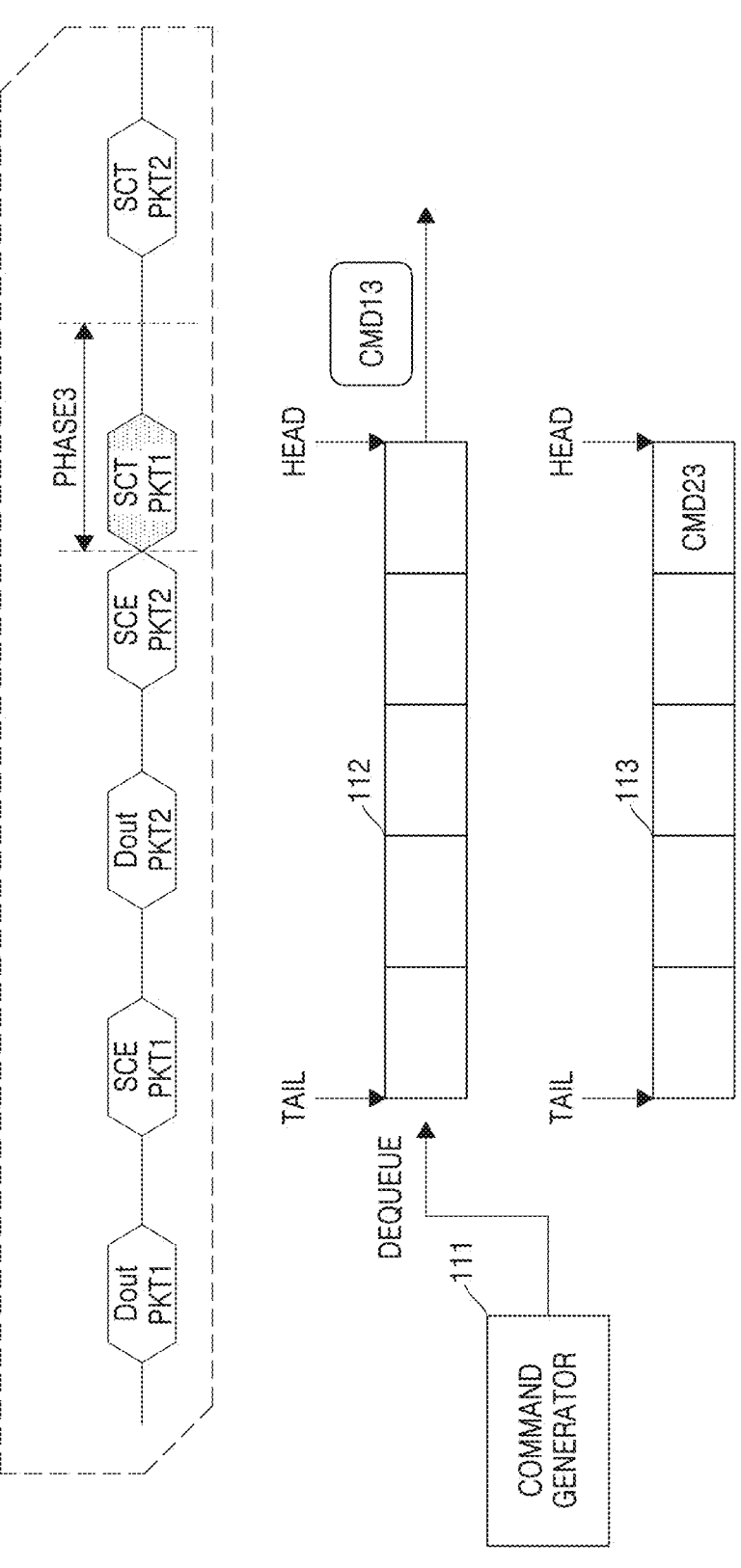

Referring to FIGS. 6 and 12, in a third phase PHASE3, the first SCT packet SCT PKT1 may be transmitted to the first non-volatile memory die 121. To this end, in the third phase PHASE3, the command generator 111 may sequentially dequeue from the first command queue 112 the command CMD13 stored in the first command queue 112. The second phase PHASE2 and the third phase PHASE3 may be included in a period during which the first data DATA1 of FIG. 6 is transmitted to the memory controller 110.

Figure 13:
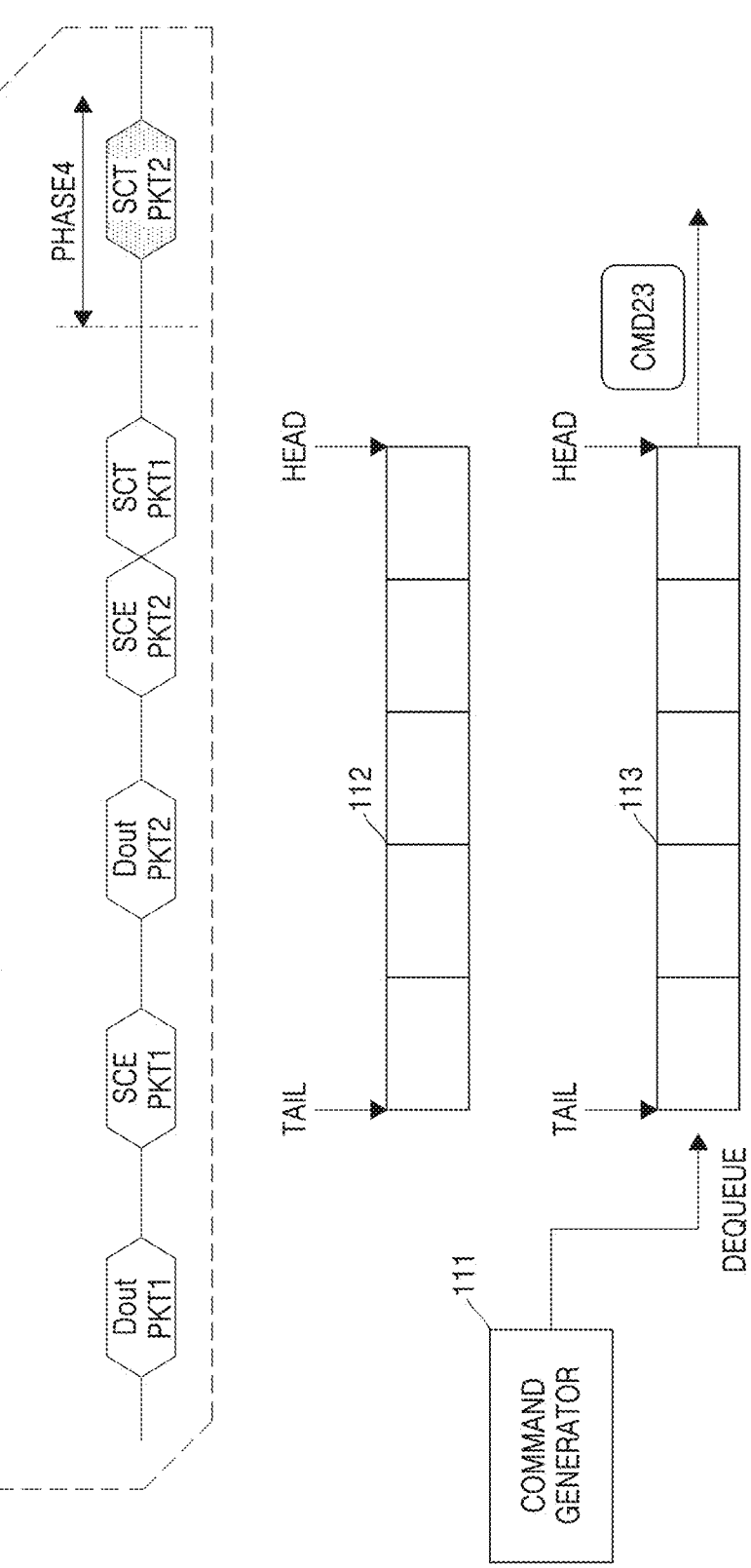

Referring to FIGS. 6 and 13, in a fourth phase PHASE4, the second SCT packet SCT PKT2 may be transmitted to the second non-volatile memory die 122. To this end, in the fourth phase PHASE4, the command generator 111 may dequeue from the second command queue 113 the command CMD23 stored in the second command queue 113. The fourth phase PHASE4 may be included in a period during which the second data DATA2 of FIG. 6 is transmitted to the memory controller 110.

Figure 14:
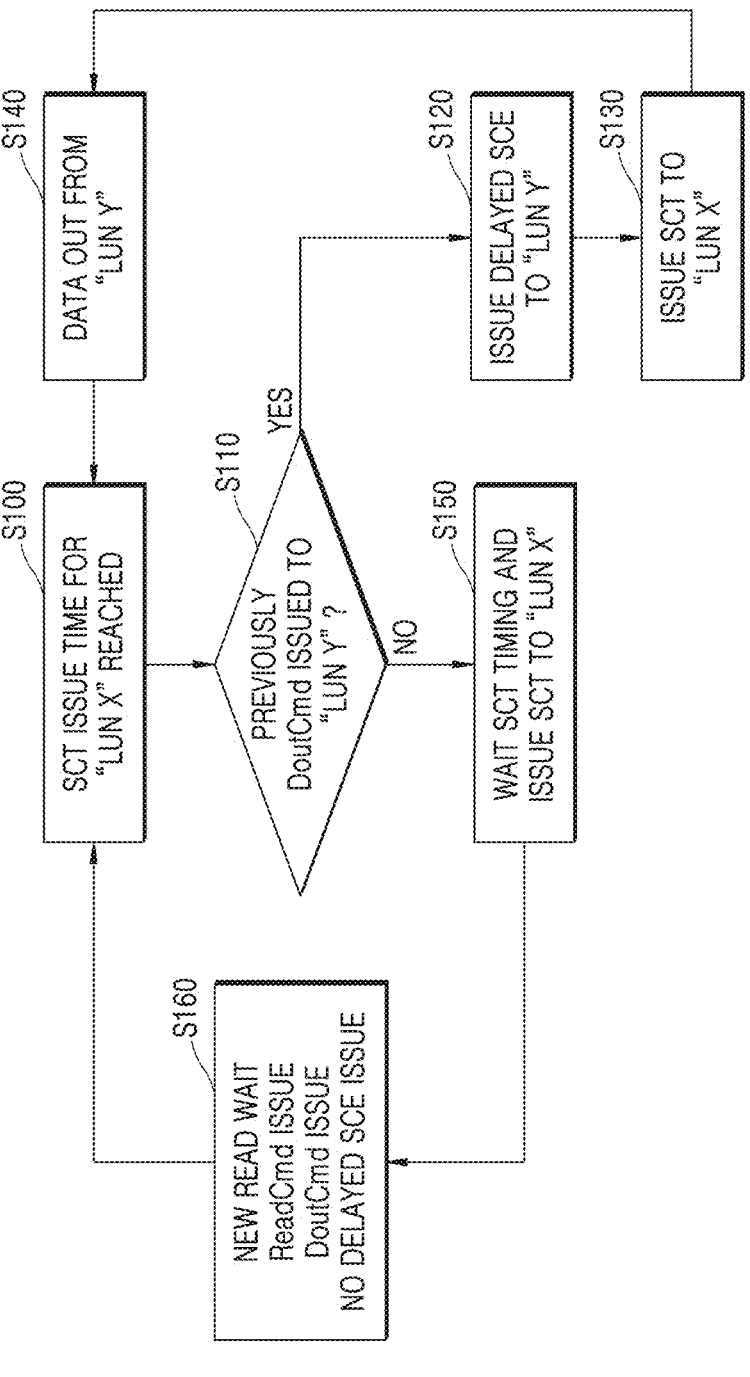
FIG. 14 is a flowchart illustrating an operation of a memory controller according to an embodiment.

FIG. 14 is a flowchart illustrating an operation of the memory controller 110 according to an embodiment.

Referring to FIG. 14, in operation S100, the memory controller 110 determines that a timing to issue an SCT packet for an LUN X has been reached. Here, the LUN X is any LUN, and for example, the LUN X may correspond to the first non-volatile memory die 121.

In operation S110, the memory controller 110 determines whether the data output command packet DOUT PKT has been issued to a LUN Y. For example, the memory controller 110 may determine whether the data output command packet DOUT PKT has been issued to the LUN Y before issuing the SCT packet for the LUN X. Here, the LUN Y is any LUN different from the LUN X, and for example, the LUN Y may correspond to the second non-volatile memory die 122.

When the data output command packet DOUT PKT was previously issued to the LUN Y (Yes in operation S110), in operation S120, the memory controller 110 may issue the delayed SCE packet to the LUN Y. Here, the delayed SCE packet may include the delay time information such as the first delay flag DLF1 in the second SCE PKT2 of FIG. 6. In operation S130, the memory controller 110 may issue the SCT packet to the LUN X. In operation S140, the LUN Y may output data, and the memory controller 110 may receive data from the LUN Y.

When the data output command packet DOUT PKT was not previously issued to the LUN Y (No in operation S110), in operation S150, the memory controller 110 may wait for a SCT timing to issue the SCT packet and then may issue the SCT packet to the LUN X at the corresponding timing. In operation S160, the memory controller 110 may wait until a new read request is received, may issue a read command packet to a LUN in response to the read request, may issue a data output command packet to the LUN, and may issue an undelayed SCE packet to the LUN. Here, the undelayed SCE packet that is not delayed may include the delay time information such as the second delay flag DLF2 in the second SCE PKT2 of FIG. 7.

Figure 15:
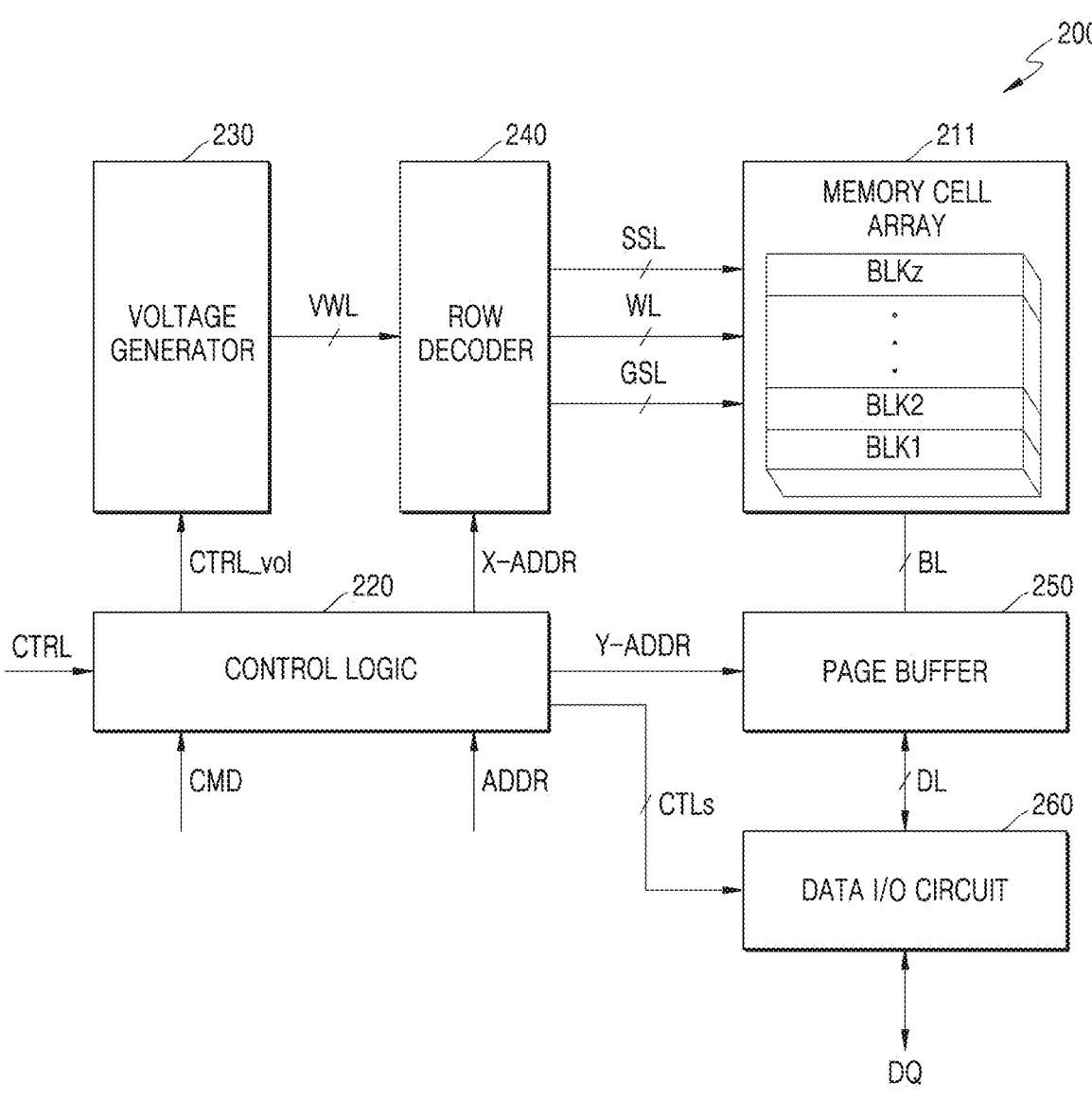
FIG. 15 is a block diagram of a non-volatile memory die according to an embodiment.

FIG. 15 is a block diagram of a non-volatile memory die 200 according to an embodiment.

Referring to FIG. 15, the non-volatile memory die 200 may include a memory cell array 211, a control logic circuit 220, a voltage generator 230, a row decoder 240, a page buffer circuit 250, and a data input/output circuit 260 (or an input/output interface).

The memory cell array 211 may include a plurality of memory cells and may be connected to a plurality of word lines WL, a plurality of string selection lines SSL, a plurality of ground selection lines GSL, and a plurality of bit lines BL. For example, the memory cell array 211 may be connected to the row decoder 240 through the plurality of word lines WL, the plurality of string selection lines SSL, and the plurality of ground selection lines GSL, and may be connected to the page buffer circuit 250 through the plurality of bit lines BL.

The memory cell array 211 may include a plurality of memory blocks BLK1 to BLKz. For example, each of the plurality of memory blocks BLK1 to BLKz may have a three-dimensional structure (or a vertical structure). The plurality of memory blocks BLK1 to BLKz may be selected by the row decoder 240. For example, the row decoder 240 may select a memory block corresponding to a block address from the plurality of memory blocks BLK1 to BLKz.

Each of the memory cells included in the memory cell array 211 may store at least one bit. For example, in some embodiments, the memory cell may be a single level cell (SLC) storing 1-bit data. In some embodiments, the memory cell may be a multi-level cell (MLC) storing 2-bit data. In some embodiments, the memory cell may be a triple level cell (TLC) storing 3-bit data. In some embodiments, the memory cell may be a quad level cell (QLC) storing 4-bit data. However, embodiments are not limited thereto.

A plurality of memory cells may be in an erased state when an erase voltage is applied to the memory cell array 211 and may be in a programmed state when a program voltage is applied to the memory cell array 211. At this time, each memory cell may have an erase state or at least one program state classified according to a threshold voltage. That is, states of memory cells may include an erase state and at least one program state, and a specific state of each memory cell may be an erase state or a specific program state.

The control logic circuit 220 may generally control various operations in the non-volatile memory die 200. For example, the control logic circuit 220 may output various control signals for writing data in the memory cell array 211 or reading data from the memory cell array 211 based on a command CMD, an address ADDR, and a control signal CTRL. The command CMD and the address ADDR may be provided to the control logic circuit 220 through the command address bus 142.

Various control signals output from the control logic circuit 220 may be provided to the voltage generator 230, the row decoder 240, and the page buffer circuit 250. The control logic circuit 220 may provide a voltage control signal CTRL_vol to the voltage generator 230.

In an embodiment, the control logic circuit 220 may generate a buffer control signal based on a data output command received through the command address bus 142. The buffer control signal may be, for example, a column address Y-ADDR. However, embodiments are not limited thereto. In an embodiment, the control logic circuit 220 may determine an output timing of a data enable signal based on the select chip enable received through the command address bus 142 and including the delay information on the output timing of the data as described above with respect to FIGS. 1-14. The data enable signal may be included in, for example, input/output control signals CTRL. The control logic circuit 220 may generate the data enable signal based on output timing of the data enable signal.

The voltage generator 230 may be connected to the memory cell array 211 through the plurality of word lines WL. The voltage generator 230 may generate various types of voltages for performing a program operation, a read operation, and an erase operation on the memory cell array 211 based on the voltage control signal CTRL_vol. The voltage generator 230 may generate word line voltages VWL, for example, the program voltage, a verification voltage, a read voltage, and the erase voltage.

The program voltage, the verification voltage, the read voltage, and the erase voltage generated by the voltage generator 230 may be provided to a word line selected from the plurality of word lines WL. The selected word line may be at least one word line selected by a row address X-ADDR. The selected word line may be referred to as a selection word line.

During the erase operation, the voltage generator 230 may apply the erase voltage to a well and/or a common source line of a memory block. The voltage generator 230 may apply an erase permission voltage (for example, a ground voltage) to all the word lines WL of the memory block or word lines corresponding to some sub-blocks based on an erase address. During an erase verification operation, the voltage generator 230 may apply an erase verification voltage to all the word lines WL of one memory block or may apply the erase verification voltage in units of word lines.

During the program operation, the voltage generator 230 may apply the program voltage to a selected word line among the plurality of word lines WL and may apply a program pass voltage to unselected word lines among the plurality of word lines WL. During a program verification operation, the voltage generator 230 may apply a program verification voltage to the selected word line and may apply a verification pass voltage to the unselected word lines.

During the read operation, the voltage generator 230 may apply the read voltage to the selected word line and may apply a read pass voltage to the unselected word lines.

The row decoder 240 may select a specific word line among the plurality of word lines WL in response to the row address X-ADDR received from the control logic circuit 220. Specifically, during the program operation, the row decoder 240 may provide the program voltage to the selected word line. The row decoder 240 may select some of the plurality of string selection lines SSL or some of the plurality of ground selection lines GSL in response to the row address X-ARRD received from the control logic circuit 220.

The page buffer circuit 250 may be connected to the memory cell array 211 through the plurality of bit lines BL. The page buffer circuit 250 may select some of the plurality of bit lines BL in response to the column address Y-ADDR received from the control logic circuit 220. During a verification operation (for example, the erase verification operation or the program verification operation) or the read operation, the page buffer circuit 250 may operate as a sense amplifier to sense data stored in a selected memory cell through a selected bit line. During the program operation, the page buffer circuit 250 may operate as a write driver to input data to be stored in the memory cell array 211.

The page buffer circuit 250 may store data read from the memory cell array 211 or may store data to be stored in the memory cell array 211.

The page buffer circuit 250 may include a page buffer group including a plurality of page buffers respectively connected to the plurality of bit lines BL. The plurality of page buffers may be arranged to correspond to the plurality of bit lines, and each page buffer may include a plurality of latches. Hereinafter, the page buffer circuit 250 will be defined as including a page buffer connected to each bit line. However, in some embodiments, the term may be defined differently, and as an example, one page buffer may be provided to correspond to a plurality of bit lines, and a unit of configuration arranged to correspond to each bit line may be defined as a page buffer unit.

In an embodiment, the page buffer circuit 250 may latch internal data stored in the memory cell array 211 based on the buffer control signal.

The data input/output circuit 260 may transmit and receive a data signal DQ through the data bus 131. For example, the data input/output circuit may receive the data signal DQ and may transmit the internal data DATA to the page buffer circuit 250. For example, the data input/output circuit 260 may receive the internal data DATA latched by the page buffer circuit 250 to transmit the data signal DQ to the memory controller 110.

In an embodiment, the data input/output circuit 260 may be connected to the data bus 131 based on the data enable signal and may output latched internal data through the data bus 131.

In an embodiment, the control logic circuit 220 may output a data disable signal based on a select chip terminate command received through the command address bus 142 after receiving the select chip enable. The data input/output circuit 260 may release the connection with the data bus 131 based on the data disable signal.

The control logic circuit 220, the voltage generator 230, the row decoder 240, the page buffer circuit 250, and the data input/output circuit 260 may be included in a peripheral circuit.

Figure 16:
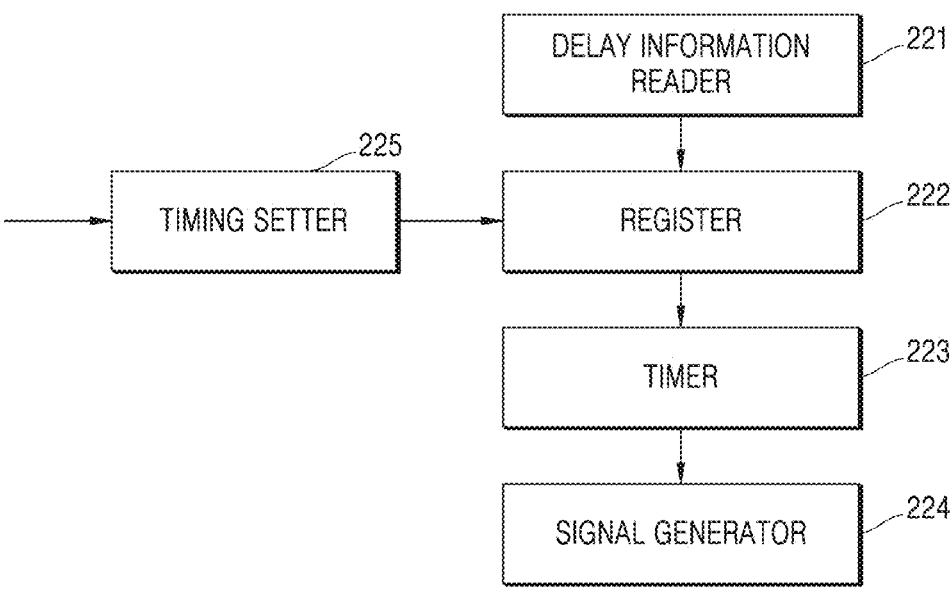
FIG. 16 is a block diagram of a control logic circuit according to an embodiment.

FIG. 16 is a block diagram of a control logic circuit 220 according to an embodiment.

Referring to FIG. 16, the control logic circuit 220 may include a delay information reader 221, a register 22322, a timer 223, and a signal generator 224. In an embodiment, the control logic circuit 220 may further include a timing setter 225.

The delay information reader 221 may read delay information of the SCE packet SCE PKT and may generate a read result. In an embodiment, the delay information may include a single bit indicating output timing of data as a default time or indicating that output timing of data is delayed than the default time. For example, the delay information may include the first delay flag DLF1 or the second delay flag DLF2.

The register 222 may store first timing data and second timing data. The first timing data may indicate a default time (for example, the second time t2 corresponding to the preamble time of FIGS. 5 to 7). The second timing data may indicate a delay time greater than the default time. The register 222 may output any one of the first timing data and the second timing data selected according to the read result.

The timer 223 may count a time corresponding to any one timing data provided by the register 222. For example, when the timer 223 receives the first timing data, a cycle of a clock may be counted from an initial time to the default time. For example, when the timer 223 receives the second timing data, a cycle of a clock may be counted from the initial time to the delay time. The timer 223 may generate an enable signal when counting of a time is completed.

The signal generator 224 may generate the data enable signal based on the enable signal. The signal generator 224 may output the data disable signal based on the select chip terminate.

The timing setter 225 may initiate setting a value of the register 222 based on the set feature command received through the command address bus 142. In some embodiments, the timing setter 225 may set the second timing data of the register 222 based on set feature data received through the command address bus 142.

Figure 17:
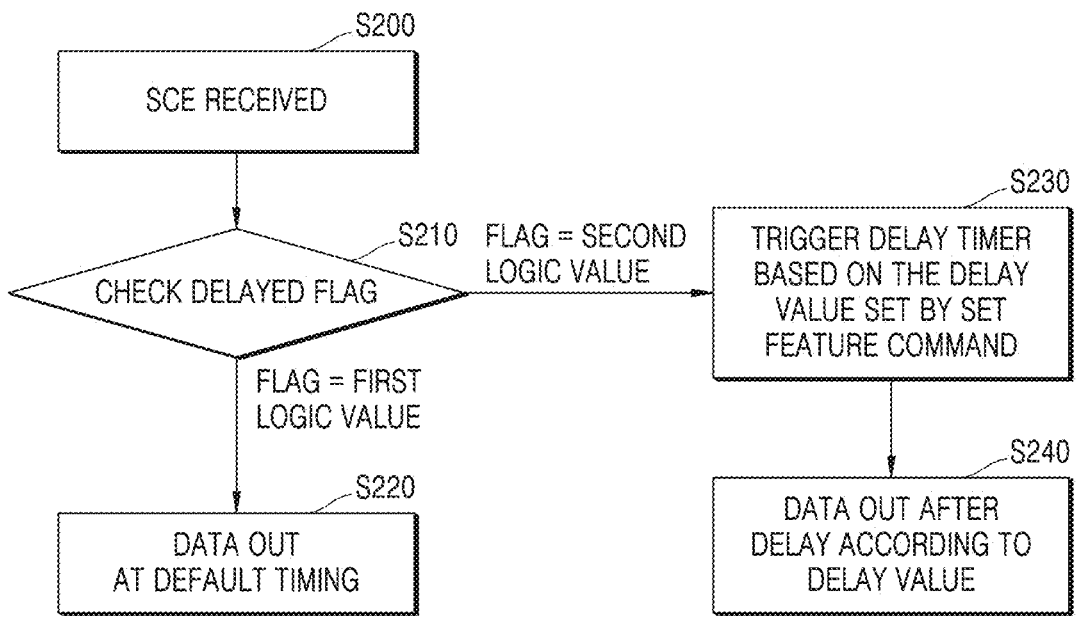
FIG. 17 is a flowchart illustrating an operation of a non-volatile memory die according to an embodiment.

FIG. 17 is a flowchart illustrating an operation of a non-volatile memory die 200 according to an embodiment.

Referring to FIG. 17, in operation S200, the control logic circuit 220 may receive the SCE packet through the command address bus 142.

In operation S210, the control logic circuit 220 may check a logic value of a delayed flag in the SCE packet.

When the logic value of the delayed flag is the first logic value, in operation S220, the control logic circuit 220 may provide the buffer control signal (for example, the column address Y-ADDR) to the page buffer circuit 250 at default timing (for example, after the preamble time has passed from the point in time at which the SCE packet is output) and may provide the data enable signal to the data input/output circuit 260. In addition, the data input/output circuit 260 may transmit the data signal DQ to the memory controller 110 through the data bus 131.

When the logic value of the delay flag is the second logic value, in operation S230, the delay timer (for example, the timer 223) in the control logic circuit 220 may count the time from the initial time to the time according to the delay value based on the delay value set by the set feature command. In operation S240, the control logic circuit 220 may provide the buffer control signal to the page buffer circuit 250 after a delay time according to the delay value and may provide the data enable signal to the data input/output circuit 260. In addition, the data input/output circuit 260 may transmit the data signal DQ to the memory controller 110 through the data bus 131.

Figure 18:
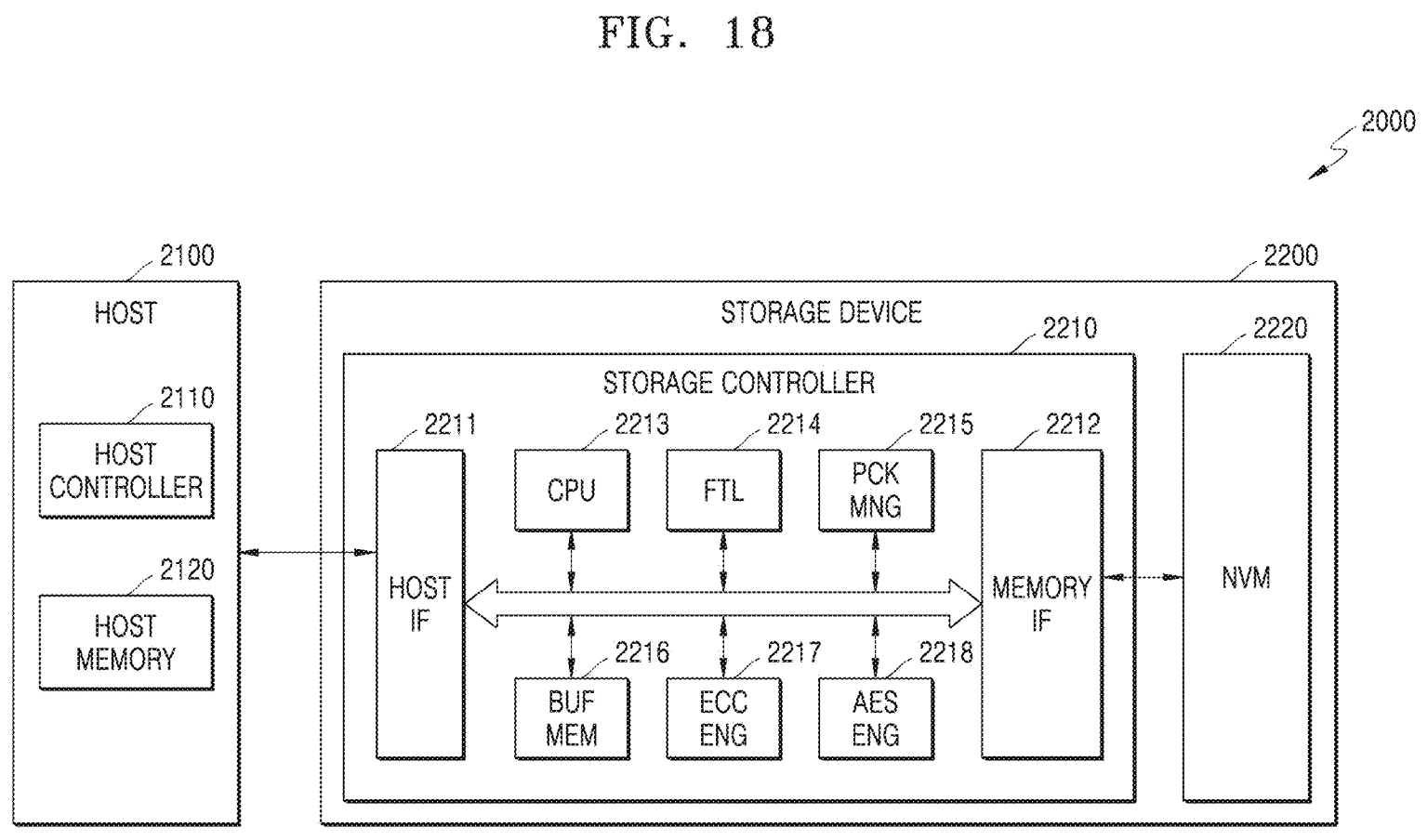

FIG. 18 is a block diagram of a storage system 2000 according to an embodiment.

Referring to FIG. 18, the storage system 2000 may include a host 2100 and a storage device 2200. In an embodiment, the storage device 2200 may include a storage controller 2210 and non-volatile memory NVM 2220. In an embodiment, the host 2100 may include a host controller 2110 and host memory 2120. The host memory 2120 may function as buffer memory for temporarily storing data to be transmitted to the storage device 2200 or data transmitted from the storage device 2200.

The storage device 2200 may include storage media for storing data according to a request from the host 2100. As an example, the storage device 2200 may include at least one of a solid state drive (SSD), embedded memory, or removable external memory. When the storage device 2200 is the SSD, the storage device 2200 may comply with the non-volatile memory express (NVMe) standard. When the storage device 2200 is the embedded memory or the external memory, the storage device 2200 may comply with the universal flash storage (UFS) or embedded multi-media card (eMMC) standard. The host 2100 and the storage device 2200 may generate and transmit packets according to the adopted standard protocol, respectively.

When the non-volatile memory 2220 of the storage device 2200 includes flash memory, the flash memory may include a 2D NAND memory array or a 3D (or vertical) NAND (VNAND) memory array. In some embodiments, the storage device 2200 may include various other types of non-volatile memories. For example, the storage device 2200 may include magnetic RAM (MRAM), spin-transfer torque MRAM, conductive bridging RAM (CBRAM), ferroelectric RAM (FeRAM), phase-change RAM (PRAM), resistive RAM (RRAM), and/or one of other various types of memory.

According to an embodiment, the host controller 2110 and the host memory 2120 may be implemented as separate semiconductor chips. In some embodiments, the host controller 2110 and the host memory 2120 may be integrated into the same semiconductor chip. For example, the host controller 2110 may be any one of a plurality of modules provided in an application processor, and the application processor may be implemented as a system on chip (SoC). In some embodiments, the host memory 2120 may be the embedded memory provided in the application processor or the non-volatile memory or a memory module arranged outside the application processor.

The host controller 2110 may manage an operation of storing data (for example, write data) of a buffer region of the host memory 2120 in the non-volatile memory 2220 or storing data (for example, read data) of the non-volatile memory 2220 in the buffer region.

The storage controller 2210 may include a host interface (I/F) 2211, a memory interface (I/F) 2212, and a central processing unit (CPU) 2213. In some embodiments, the storage controller 2210 may further include a flash translation layer (FTL) 2214, a packet manager (PCK MNG) 2215, buffer memory (BUF MEM) 2216, an error correction code (ECC) engine (ECC ENG) 2217, and an advanced encryption standard (AES) engine (AES ENG) 2218. The storage controller 2210 may further include a working memory (not shown) on which the FTL 2214 is loaded, and a write operation and a read operation for the non-volatile memory 2220 may be controlled by the CPU 2213 executing the FTL 2214.

The host interface (I/F) 2211 may transmit and receive packets to and from the host 2100. A packet transmitted from the host 2100 to the host interface 2211 may include a command or data to be stored in the non-volatile memory 2220, and a packet transmitted from the host interface 2211 to the host 2100 may include a response to the command or data read from the non-volatile memory 2220. The memory interface 2212 may transmit data to be stored in the non-volatile memory 2220 to the non-volatile memory 2220 or may receive read data from the non-volatile memory 2220. The memory interface 2212 may be implemented to comply with standard protocols such as toggle or open NAND flash interface (ONFI).

In an embodiment, the CPU 2213 as a processor may receive data and a command signal from the outside, may output a plurality of control signals to the memory interface 2212 based on the command signal, and may output a clock signal and data to the memory interface 2212.

The FTL 2214 may perform several functions such as address mapping, wear-leveling, and garbage collection. The address mapping operation is an operation of changing a logical address received from the host 2100 into a physical address used to actually store data in the non-volatile memory 2220. Wear-leveling as technology of preventing excessive deterioration of specific blocks by uniformly using blocks in the non-volatile memory 2220 may be implemented through firmware technology of balancing erase counts of physical blocks. Garbage collection is technology of securing usable capacity in the non-volatile memory 2220 by copying valid data of a block to a new block and then erasing the existing block.

The packet manager (PCK MNG) 2215 may generate a packet according to a protocol of an interface negotiated with the host 2100 or may parse various information items from the packet received from the host 2100. In some embodiments, the buffer memory 2216 may temporarily store data to be stored in the non-volatile memory 2220 or data to be read from the non-volatile memory 2220. The buffer memory 2216 may be provided in the storage controller 2210, but may also be arranged outside the storage controller 2210.

The ECC engine (ECC ENG) 2217 may perform error detection and correction functions on data read from the non-volatile memory 2220. More specifically, the ECC engine 2217 may generate parity bits for write data to be stored in the non-volatile memory 2220, and the generated parity bits may be stored in the non-volatile memory 2220 together with the write data. When reading data from the non-volatile memory 2220, the ECC engine 2217 may correct errors in the read data by using the parity bits read from the non-volatile memory 2220 together with the read data and may output the error-corrected read data.

The AES engine (AES ENG) 2218 may perform at least one of an encryption operation and a decryption operation for data input to the storage controller 2210 by using a symmetric-key algorithm.

The memory interface (I/F) 2212 is a memory interface circuit, and embodiments of FIGS. 1-17 may be applied to the memory interface (I/F) 2212. The memory interface 2212 may generate a plurality of driving signals based on data and a clock signal. In some embodiments, the memory interface 2212 may output internal data to the non-volatile memory 2220 based on the plurality of control signals and the plurality of driving signals. The non-volatile memory 2220 may store the internal data in a memory cell array.

Figure 19:
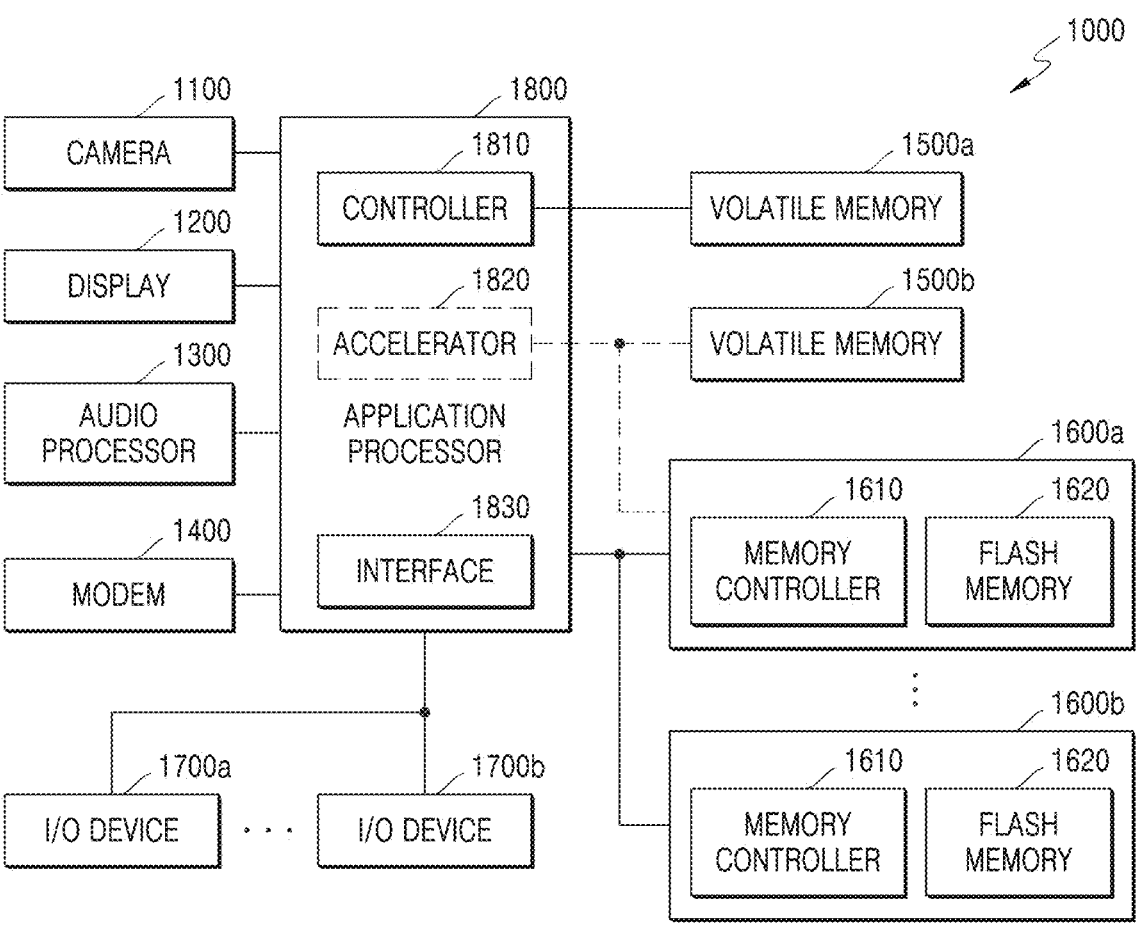
FIG. 19 is a diagram illustrating an electronic system according to some embodiments.

FIG. 19 is a diagram illustrating an electronic system 1000 according to some embodiments.

Referring to FIG. 19, the electronic system 1000 may be implemented as a laptop computer, a mobile phone, a smartphone, a tablet personal computer (PC), a wearable device, a healthcare device, and/or an Internet of things (IoT) device. In some embodiments, the electronic system 1000 may be implemented as a server or a PC.

The electronic system 1000 may include a camera 1100, a display 1200, an audio processor 1300, a modem 1400, volatile memories 1500a and 1500b, flash memories 1600a and 1600b, I/O devices 1700a and 1700b, and an application processor 1800 (hereinafter, referred to as an "AP").

The camera 1100 may capture a still image or a moving image under user control.

The audio processor 1300 may process audio data included in the flash memories 1600a and 1600b or a network content.

The modem 1400 may modulate and transmit a signal for wired/wireless data transmission/reception, and may demodulate the signal to restore the original signal at a receiving end.

The I/O devices 1700a and 1700b may include devices providing digital input and/or output functions.

The AP 1800 may control an overall operation of the electronic system 1000. The AP 1800 may control the display 1200 to display part of the content. When a user input is received through the I/O devices 1700a and 1700b, the AP 1800 may perform a control operation corresponding to the user input. The AP 1800 may include an accelerator 1820 that is a dedicated circuit for artificial intelligence (AI) data operation, and an interface 1830. The volatile memory 1500b may be additionally mounted in the accelerator 1820. The accelerator 1820 may be a functional block specialized in performing a specific function of the AP 1800. The accelerator 1820 may include a graphics processing unit (GPU), a natural processing unit (NPU), and/or a data processing unit (DPU). The GPU may be a block specialized in performing graphics data processing. The NPU may be a block specialized in performing AI calculation and inference. The DPU may be a block specialized in data transmission.

The AP 1800 may control the volatile memories 1500a and 1500b through a command and mode register setting (for example, MRS) that comply with the JEDEC standard. In some embodiments, the AP 1800 may set DRAM interface protocols to use company-specific functions such as low voltage/high speed/reliability and cyclic redundancy check (CRC)/error correction code (ECC) functions.

The volatile memories 1500a and 1500b have relatively smaller latency and bandwidth than the I/O devices 1700a and 1700b or the flash memories 1600a and 1600b. The volatile memories 1500a and 1500b may be initialized at a power-on point in time of the electronic system 1000, and an operating system and application data may be loaded to be used as a temporary storage place for the operating system and application data or as an execution space for various software codes. In some embodiments, the volatile memories 1500*a* and 1500*b* may each be a DRAM.

In the volatile memories 1500*a* and 1500*b*, arithmetic operations such as addition, subtraction, multiplication, and division, vector operations, address operations, and/or fast Fourier transform (FFT) operations may be performed. In some embodiments, a function used for inference may be performed by the volatile memories 1500*a* and 1500*b*.

The flash memories 1600*a* and 1600*b* may store pictures taken by the camera 1100, or may store data received through a data network. The flash memories 1600*a* and 1600*b* may have a capacity greater than that of the volatile memories 1500*a* and 1500*b*. Embodiments with respect to FIGS. 1-18 may be applied to, for example, the flash memories 1600*a* and 1600*b*.

Figure 20:
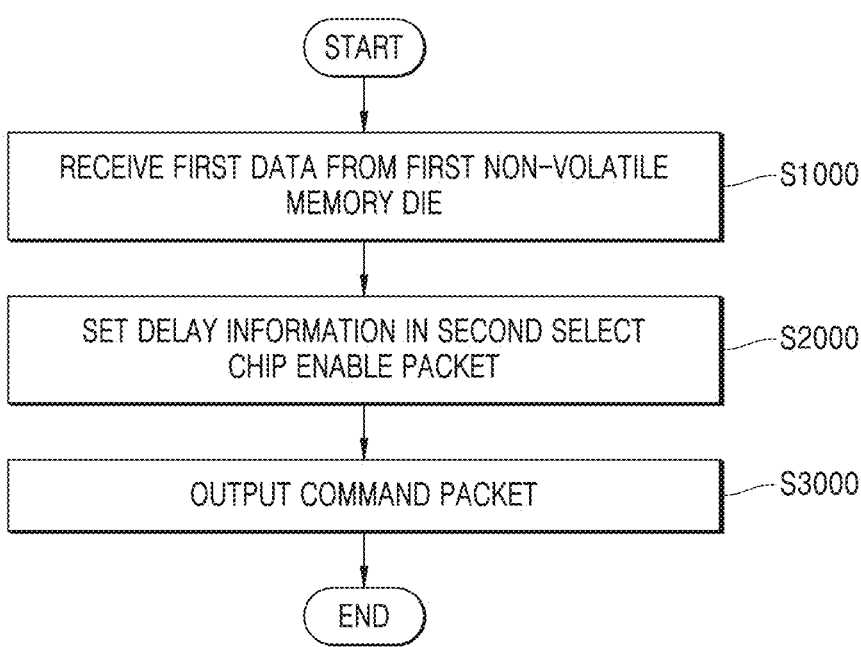
FIG. 20 is a flowchart of a method of operating a memory controller according to an embodiment.

FIG. 20 is a flowchart of a method of operating the memory controller 110 according to an embodiment.

Referring to FIG. 20, in operation S1000, the first data is received from the first non-volatile memory die.

In operation S2000, delay information is set in the second select chip enable packet. The second select chip enable packet may select the second non-volatile memory die, and the delay information may delay the output timing of the second data. In an embodiment, the memory controller 110 may set the delay information in the second select chip enable packet based on whether the second data output command packet instructing the second non-volatile memory die to output the second data is output before the first select chip terminate command packet for terminating selection of the first non-volatile memory die is output.

In operation S3000, the command packet is output. In an embodiment, the memory controller 110 may output the command packet based on the setting of the delay information. For example, the command packet may include the second data output command packet, the second select chip enable packet, and the first select chip terminate command packet.

In an embodiment, operation S2000 may include setting first delay information including a first delay time greater than the default time in the second select chip enable packet based on the second data output command packet being output before the first select chip terminate command packet is output. Operation S3000 may include outputting the second data output command packet, outputting the second select chip enable packet in parallel with the first data after the second data output command packet is output, and outputting the first select chip terminate command packet after the second select chip enable is output.

In an embodiment, operation S2000 may include setting second delay information including the default time in the second select chip enable packet based on the second data output command packet being output after the first select chip terminate command packet is output. Operation S3000 may include outputting the first select chip terminate command packet at the point in time at which the reception of the first data is completed, outputting the second data output command packet, and outputting the second select chip enable packet after the second data output command packet is output.

In an embodiment, the method of operating the memory controller may further include receiving the second data from the second non-volatile memory die after outputting the command packet, and outputting the second select chip terminate command packet for terminating selection of the second non-volatile memory die at a point in time at which reception of the second data from the second non-volatile memory die is completed.

In an embodiment, the method of operating the memory controller may further include outputting a third data output command packet instructing any one non-volatile memory die different from the second non-volatile memory die among the plurality of non-volatile memory dies to output data before outputting the second select chip terminate command packet, outputting a third select chip enable packet selecting any one non-volatile memory die after outputting the third data output command packet, and outputting the second select chip terminate command packet after outputting the third select chip enable packet. At this time, the third select chip enable packet may include the first delay information indicating the first delay time greater than the default time.

In an embodiment, the method of operating the memory controller may further include outputting the third data output command packet instructing any one non-volatile memory die different from the second non-volatile memory die among the plurality of non-volatile memory dies to output data after outputting the second select chip terminate command packet, and outputting the third select chip enable packet selecting any one non-volatile memory die after outputting the third data output command packet. At this time, the third select chip enable packet may include the second delay information indicating the default time.

While various embodiments have been particularly shown and described with reference to the drawings, it will be understood that various changes in form and details may be made therein without departing from the spirit and scope of the following claims.

What is claimed is:

1. A storage device comprising:
   a non-volatile memory device including a plurality of non-volatile memory dies; and
   a memory controller configured to
      output a first data output command address packet that instructs a first non-volatile memory die among the plurality of non-volatile memory dies to output first data, through a command address bus,
      receive the first data from the first non-volatile memory die through a data bus, and
      sequentially output a second data output command packet that instructs a second non-volatile memory die among the plurality of non-volatile memory dies to output second data, a second select chip enable packet that selects the second non-volatile memory die, and a first select chip terminate command packet that terminates selection of the first non-volatile memory die, through the command address bus, and
   wherein the second select chip enable packet comprises a header that indicates a select chip enable, a first body that specifies the second non-volatile memory die, and a second body that includes first delay information for delaying an output point in time of the second data.

2. The storage device of claim 1, wherein, after the first select chip terminate command packet is output, the memory controller receives the second data from the second non-volatile memory die and outputs a second select chip terminate command packet that terminates selection of the second non-volatile memory die.

3. The storage device of claim 2, wherein the memory controller outputs a third data output command packet for any one of the plurality of non-volatile memory dies different from the second non-volatile memory die, outputs a third select chip enable packet for the any one non-volatile memory die after outputting the third data output command packet, and outputs the second select chip terminate command packet after outputting the third select chip enable packet, and wherein the third select chip enable packet comprises the first delay information.

4. The storage device of claim 2, wherein the memory controller outputs a third data output command packet for any one of the plurality of non-volatile memory dies different from the second non-volatile memory die after outputting the second select chip terminate command packet and outputs a third select chip enable packet for the any one non-volatile memory die after outputting the third data output command packet, and wherein the third select chip enable packet comprises second delay information different from the first delay information.

5. The storage device of claim 4, wherein the second non-volatile memory die outputs the second data after a first delay time has passed from a point in time at which the second select chip enable packet is received, the first delay time being greater than a reference time, and wherein the any one of the plurality of non-volatile memory dies outputs third data after the reference time has passed from a point in time at which the third select chip enable packet is received.

6. The storage device of claim 1, wherein, after outputting the second select chip enable packet, the memory controller outputs the first select chip terminate command packet when reception of the first data is completed.

7. The storage device of claim 1, wherein the memory controller transmits two-bit command address signals to the non-volatile memory device for every unit cycle, transmits twelve-bit command address signals transmitted for six unit cycles to the non-volatile memory device as one command address packet, and transmits a command address signal of at least one bit corresponding to the first delay information to the non-volatile memory device in at least one of fifth and sixth unit cycles of six cycles.

8. The storage device of claim 1, wherein the memory controller comprises:

a first command queue configured to store a first command packet for the first non-volatile memory die;

a second command queue configured to store a second command packet for the second non-volatile memory die; and a command generator configured to generate the first select chip terminate command packet, the second data output command packet, and the second select chip enable packet, to enqueue the first select chip terminate command packet in the first command queue, and to enqueue the second data output command packet and the second select chip enable packet in the second command queue.

9. The storage device of claim 1, wherein the memory controller outputs a set feature command packet through the command address bus and, after outputting the set feature command packet, outputs at least one set feature data indicating a delay time for delaying an output point in time of data output from each of the plurality of non-volatile memory dies.

10. A method of operating a memory controller, the method comprising:

receiving first data from a first non-volatile memory die;

inserting delay information in a second select chip enable packet that selects a second non-volatile memory die, the delay information delaying an output timing of second data and being based on whether a second data output command packet that instructs the second non-volatile memory die to output second data is output before a first select chip terminate command packet that terminates selection of the first non-volatile memory die is output; and outputting a command packet including the second data output command packet, the second select chip enable packet, and the first select chip terminate command packet based on the delay information that is set.

11. The method of claim 10, wherein inserting the delay information comprises inserting first delay information including a first delay time that is greater than a default time in the second select chip enable packet based on the second data output command packet being output before the first select chip terminate command packet is output, and wherein outputting the command packet comprises:

outputting the second data output command packet;

after the second data output command packet is output, outputting the second select chip enable packet in parallel with the first data; and after the second select chip enable packet is output, outputting the first select chip terminate command packet.

12. The method of claim 10, wherein inserting the delay information comprises:

inserting second delay information including a default time in the second select chip enable packet based on the second data output command packet being output after the first select chip terminate command packet is output, and wherein outputting the command packet comprises:

outputting the first select chip terminate command packet at a point in time at which reception of the first data is completed;

outputting the second data output command packet; and after the second data output command packet is output, outputting the second select chip enable packet.

13. The method of claim 10, further comprising:

after outputting the command packet, receiving the second data from the second non-volatile memory die; and outputting a second select chip terminate command packet at a point in time at which reception of the second data from the second non-volatile memory die is completed, the second select chip terminate command packet terminating selection of the second non-volatile memory die.

14. The method of claim 13, further comprising:

before the second select chip terminate command packet is output, outputting a third data output command packet that instructs any one of a plurality of non-volatile memory dies different from the second non-volatile memory die to output data;

after outputting the third data output command packet, outputting a third select chip enable packet that selects the any one of the plurality of non-volatile memory dies, and after outputting the third select chip enable packet, outputting the second select chip terminate command packet, wherein the third select chip enable packet comprises first delay information indicating a first delay time greater than a default time.

15. The method of claim 13, further comprising:

after outputting the second select chip terminate command packet, outputting a third data output command packet that instructs any one of a plurality of non-volatile memory dies different from the second non-volatile memory die to output data; and after outputting the third data output command packet, outputting a third select chip enable packet that selects the any one of the plurality of non-volatile memory dies, wherein the third select chip enable packet comprises second delay information indicating a default time.

16. A non-volatile memory device comprising:

a memory cell array including a plurality of memory cells;

a control logic circuit configured to generate a buffer control signal based on a data output command received through a command address bus, to determine a data enable signal output timing of a data enable signal based on a select chip enable that is received through the command address bus and that includes delay information for delaying a data output timing of data, and to generate the data enable signal based on the data enable signal output timing;

a page buffer group configured to latch internal data stored in the memory cell array based on the buffer control signal; and a data input/output circuit connected to a data bus based on the data enable signal and configured to output the latched internal data through the data bus.

17. The non-volatile memory device of claim 16, wherein the control logic circuit comprises:

a delay information reader configured to read the delay information and to generate a read result;

a register configured to store first timing data indicating a default time and second timing data indicating a delay time that is greater than the default time, and to output any one of the first timing data and the second timing data selected according to the read result;

a timer configured to count rising and falling edges of a clock signal up to a time corresponding to the any one of the first timing data and the second timing data provided by the register and to generate an enable signal when counting of the time is completed; and a signal generator configured to generate the data enable signal based on the enable signal.

18. The non-volatile memory device of claim 17, wherein the delay information comprises a single bit that indicates a data output timing as the default time or that indicates that the data output timing is to be delayed more than the default time.

19. The non-volatile memory device of claim 17, wherein the control logic circuit further comprises a timing setter configured to set a value of the register based on a set feature command received through the command address bus and to set the second timing data of the register based on set feature data received through the command address bus.

20. The non-volatile memory device of claim 16, wherein, after receiving the select chip enable, the control logic circuit outputs a data disable signal based on a select chip terminate received through the command address bus, and wherein the data input/output circuit releases a connection with the data bus based on the data disable signal.

* * * * *